US006766928B2

(12) United States Patent
Aftanas et al.

(10) Patent No.: US 6,766,928 B2
(45) Date of Patent: Jul. 27, 2004

(54) VEHICLE ARTICLE CARRIER FOR SUPPORTING ARTICLES ADJACENT A LIFTGATE OF A VEHICLE

(75) Inventors: Jeffrey M. Aftanas, Ortonville, MI (US); Gerard J. Kmita, Allen Park, MI (US); Milton J. Antonick, Royal Oak, MI (US)

(73) Assignee: JAC Products Inc., Saline, MI (US)

( * ) Notice: Subject to any disclaimer, the term of this patent is extended or adjusted under 35 U.S.C. 154(b) by 82 days.

(21) Appl. No.: 10/286,250

(22) Filed: Oct. 31, 2002

(65) Prior Publication Data

US 2003/0052145 A1 Mar. 20, 2003

Related U.S. Application Data

(63) Continuation-in-part of application No. 10/137,696, filed on May 2, 2002, and a continuation-in-part of application No. 09/698,761, filed on Oct. 27, 2000, now Pat. No. 6,516,984, which is a continuation-in-part of application No. 09/528,765, filed on Mar. 17, 2000, now Pat. No. 6,338,427.
(60) Provisional application No. 60/352,147, filed on Oct. 29, 2001.

(51) Int. Cl.$^7$ .............................................. B60R 9/042
(52) U.S. Cl. ....................... 224/310; 224/309; 224/315; 224/492; 414/462
(58) Field of Search ................................ 224/484, 492, 224/505, 507, 508, 309, 310, 315, 320, 321, 325, 326; 414/462

(56) References Cited

U.S. PATENT DOCUMENTS

| | | |
|---|---|---|
| 2,009,721 A | 7/1935 | Williams |
| 2,833,453 A | 5/1958 | Barreca |
| 2,888,178 A | 5/1959 | Olson |
| 3,193,124 A | 7/1965 | Essling |
| 3,531,006 A | 9/1970 | Farchmin |
| 3,720,358 A | 3/1973 | McIntire |
| 3,777,922 A | 12/1973 | Kirchmeyer |

(List continued on next page.)

FOREIGN PATENT DOCUMENTS

| | | |
|---|---|---|
| CA | 618404 | 4/1961 |
| DE | 25 51 646 A1 | 6/1977 |
| DE | 33 13 267 C2 | 1/1991 |
| DE | 41 34 715 C1 | 10/1991 |
| DE | 42 14 567 A1 | 5/1992 |

(List continued on next page.)

OTHER PUBLICATIONS

Takashi, Luggage Lifting Loading Device on Automobile Roof Topside Publication Date Sep. 1999, Publication No. 1124535, Abstract Only in English.
Reference 449406 dated Jun. 18, 1949; country and name of inventor unknown.

*Primary Examiner*—Stephen K. Cronin
(74) *Attorney, Agent, or Firm*—Harness Dickey & Pierce P.L.C.

(57) ABSTRACT

An article carrier adapted to hold cargo and other articles adjacent a liftgate of a vehicle such as a sport utility vehicle, a station wagon, or minivan. The vehicle article carrier includes a liftgate striker connectable to the liftgate of the vehicle and a bumper striker connectable to the bumper of the vehicle. A first link is pivotally connected to the roof support structure of the motor vehicle and a second link is pivotally coupled to the first link. A locking assembly is coupled to the second link and is operable in a closed position to couple the second link to the bumper striker. In an opened position, the locking assembly releases the bumper striker in response to contact from the liftgate striker to enable the quick and convenient raising of the liftgate without the need to first unlatch the article carrier from the bumper.

11 Claims, 24 Drawing Sheets

U.S. PATENT DOCUMENTS

| | | | |
|---|---|---|---|
| 3,921,869 A | 11/1975 | Rogers |
| 3,963,136 A | 6/1976 | Spanke |
| 4,007,862 A | 2/1977 | Heftmann |
| 4,101,061 A | 7/1978 | Sage et al. |
| 4,219,142 A | 8/1980 | Macpherson |
| 4,223,689 A | 9/1980 | Cox |
| 4,240,571 A | 12/1980 | Ernst |
| 4,291,823 A | 9/1981 | Freeman et al. |
| 4,294,388 A | 10/1981 | Wunstel |
| 4,350,471 A | 9/1982 | Lehmann |
| 4,406,384 A | 9/1983 | Schantz |
| 4,682,719 A | 7/1987 | Ernst et al. |
| 4,705,198 A | 11/1987 | Kamaya |
| 4,757,929 A | 7/1988 | Nelson |
| 4,809,943 A | 3/1989 | Taschero |
| 4,887,750 A | 12/1989 | Dainty |
| 4,995,538 A | 2/1991 | Marengo |
| 5,058,791 A | 10/1991 | Henriquez et al. |
| 5,065,921 A | 11/1991 | Mobley |
| 5,115,955 A | 5/1992 | Dallaire et al. |
| 5,226,570 A | 7/1993 | Pedrini |
| 5,350,145 A | 9/1994 | Fabbri Corsarini |
| 5,397,042 A | 3/1995 | Pedrini |
| 5,417,358 A | 5/1995 | Haselgrove |
| 5,449,100 A | 9/1995 | Eckhart |
| 5,460,304 A | 10/1995 | Porter et al. |
| 5,535,929 A | 7/1996 | Neill |
| 5,560,525 A | 10/1996 | Grohmann et al. |
| 5,649,655 A | 7/1997 | Kerner |
| 5,673,965 A | 10/1997 | Lenkens |
| 5,690,259 A | 11/1997 | Montani |
| 5,715,980 A | 2/1998 | Blankenburg et al. |
| 5,884,824 A | 3/1999 | Spring, Jr. |
| 5,904,463 A  * | 5/1999 | Christensen ................ 414/462 |
| 6,015,074 A | 1/2000 | Snavely et al. |
| 6,308,874 B1 | 10/2001 | Kim et al. |
| 6,338,427 B1 | 1/2002 | Aftanas et al. |

FOREIGN PATENT DOCUMENTS

| | | |
|---|---|---|
| DE | 4112190 A | 10/1992 |
| EP | 101054 | 2/1984 |
| EP | 1 104 718 A2 | 6/2001 |
| FR | 2596344 | 9/1983 |
| JP | 152643 | 9/1983 |
| JP | 11245735 | 9/1999 |

* cited by examiner

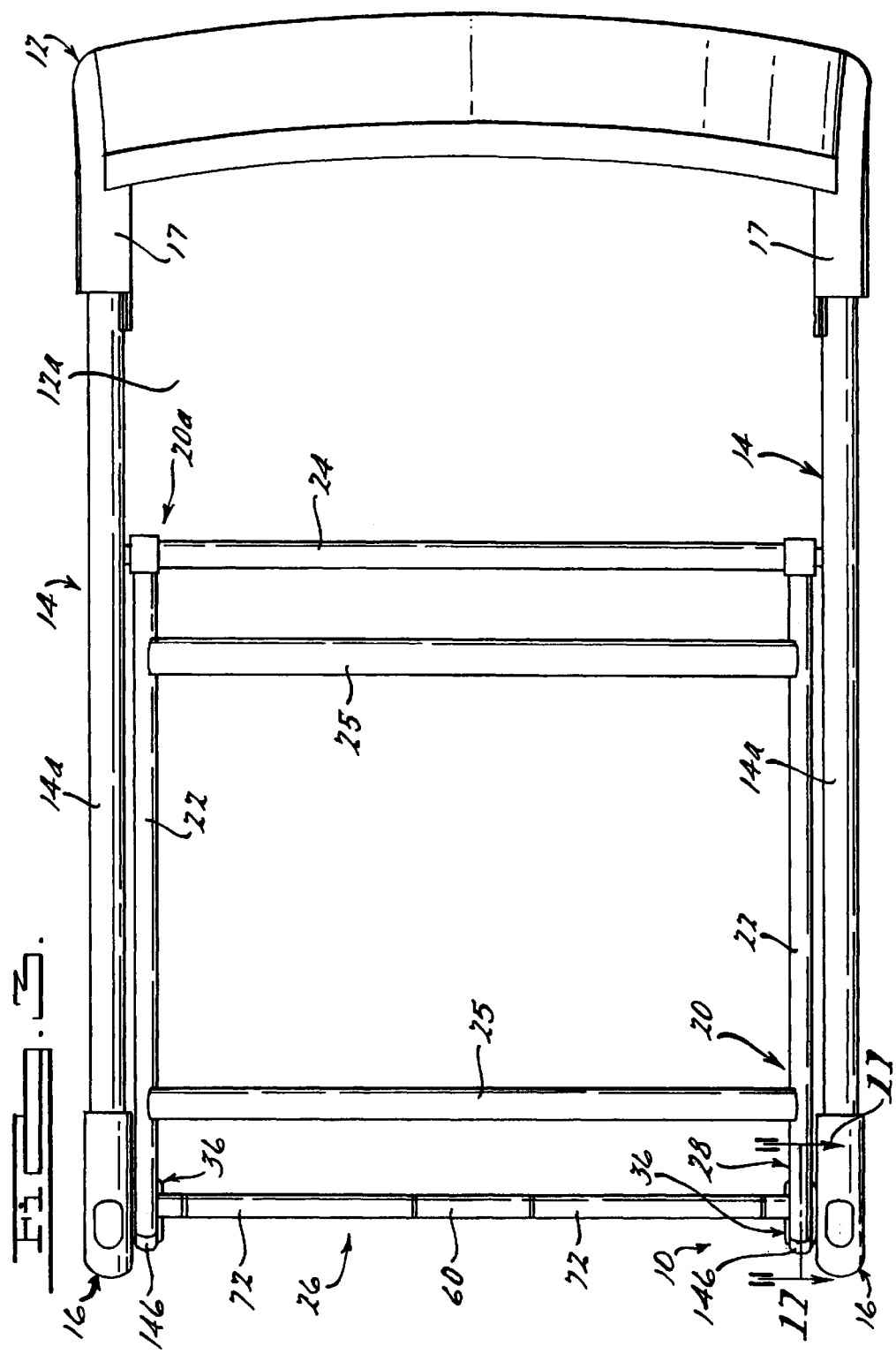

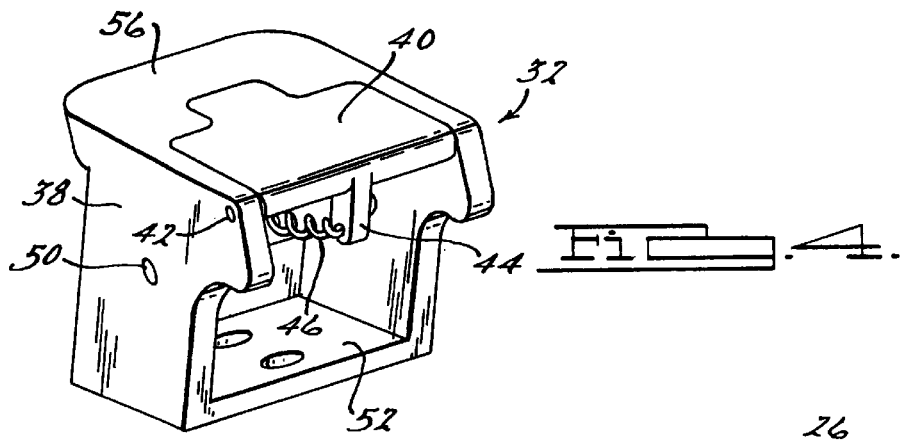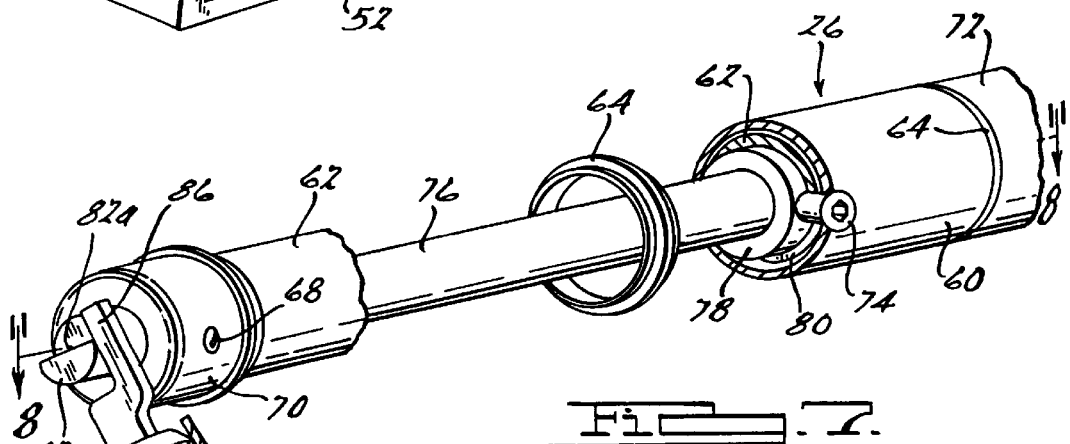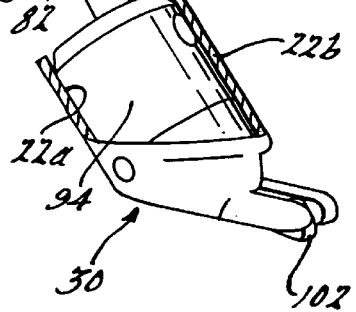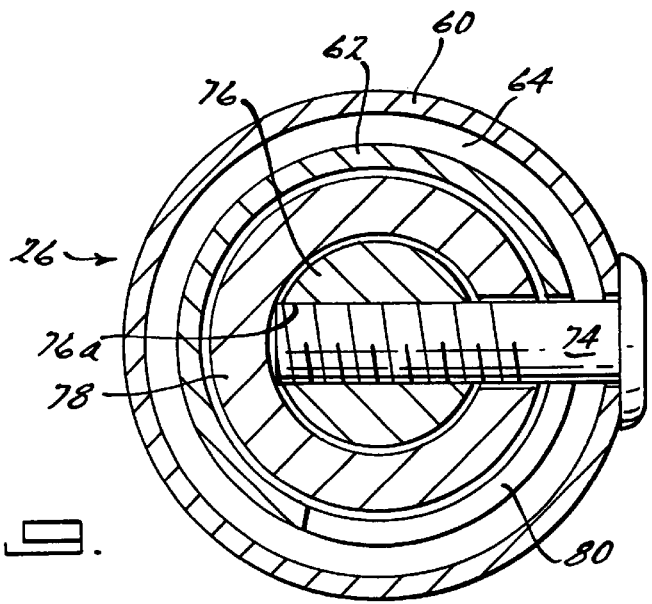

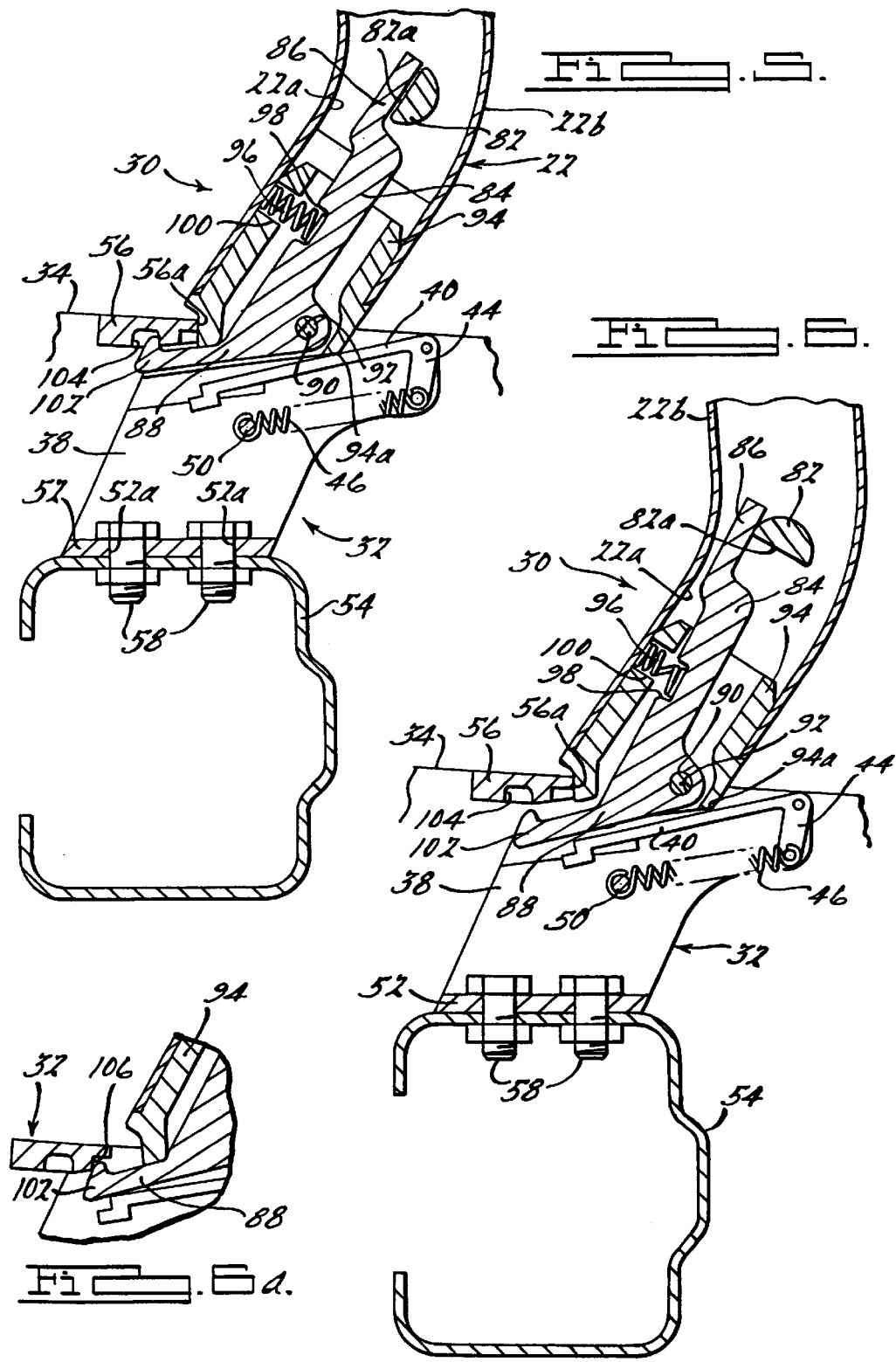

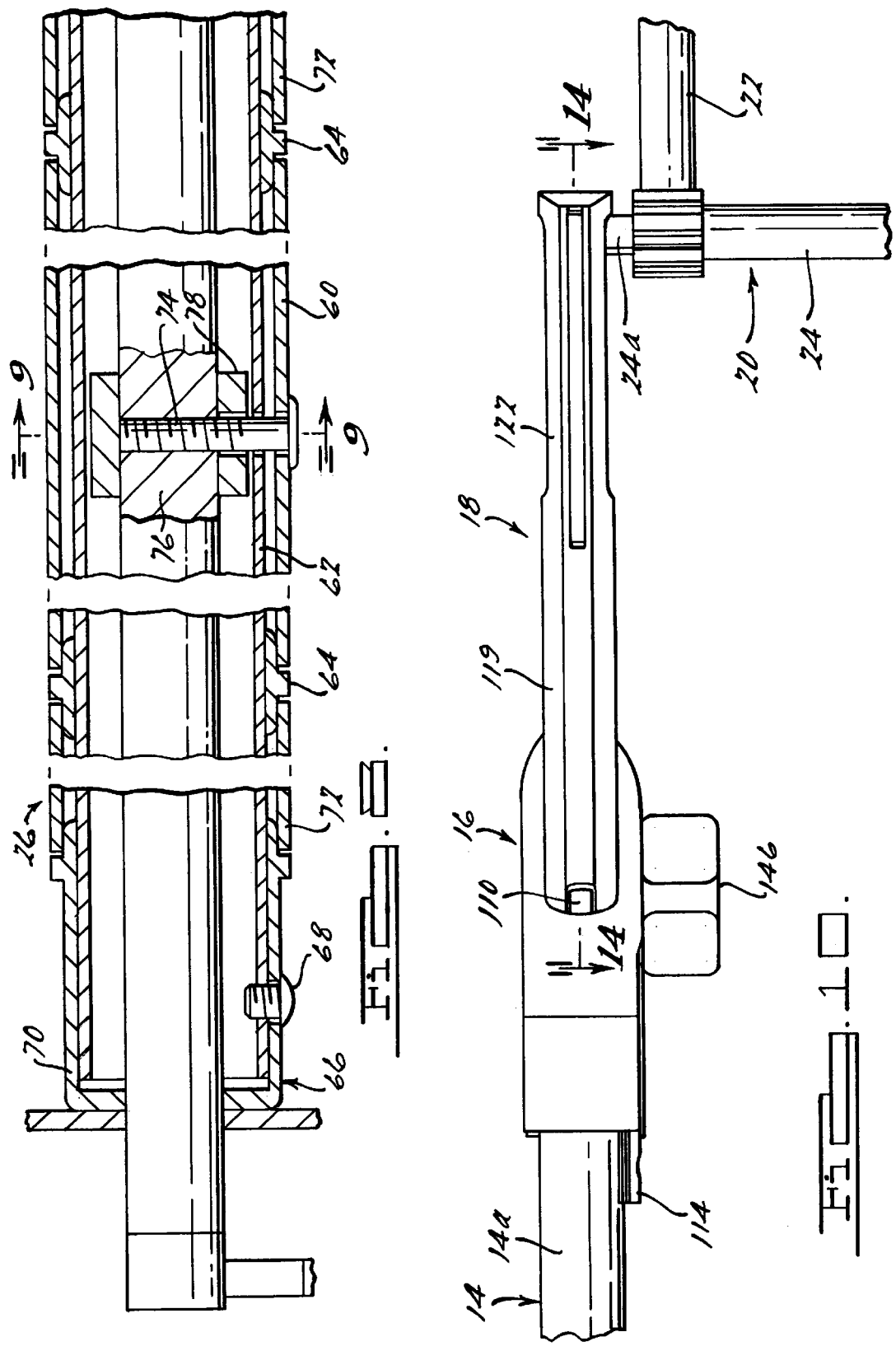

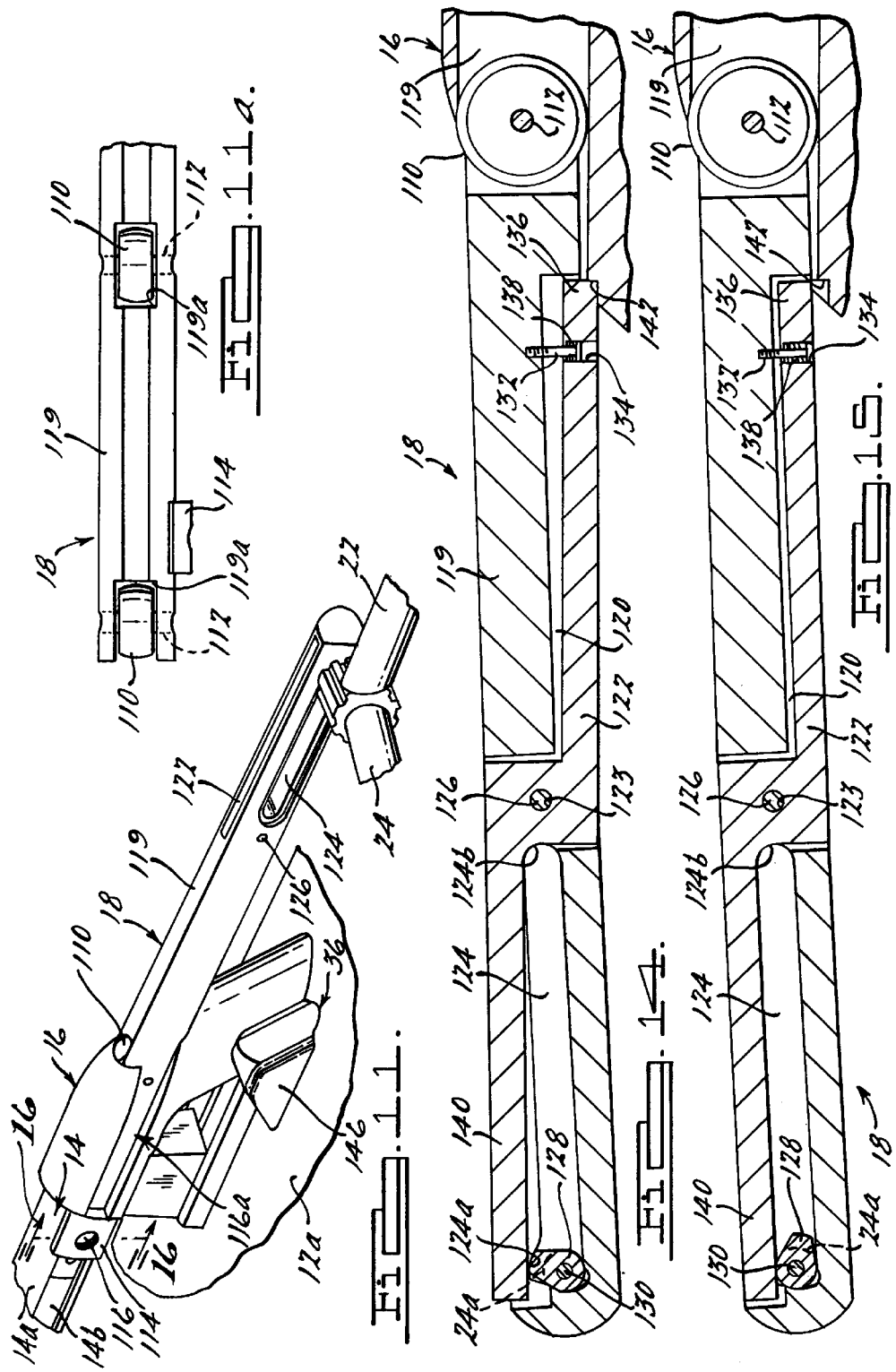

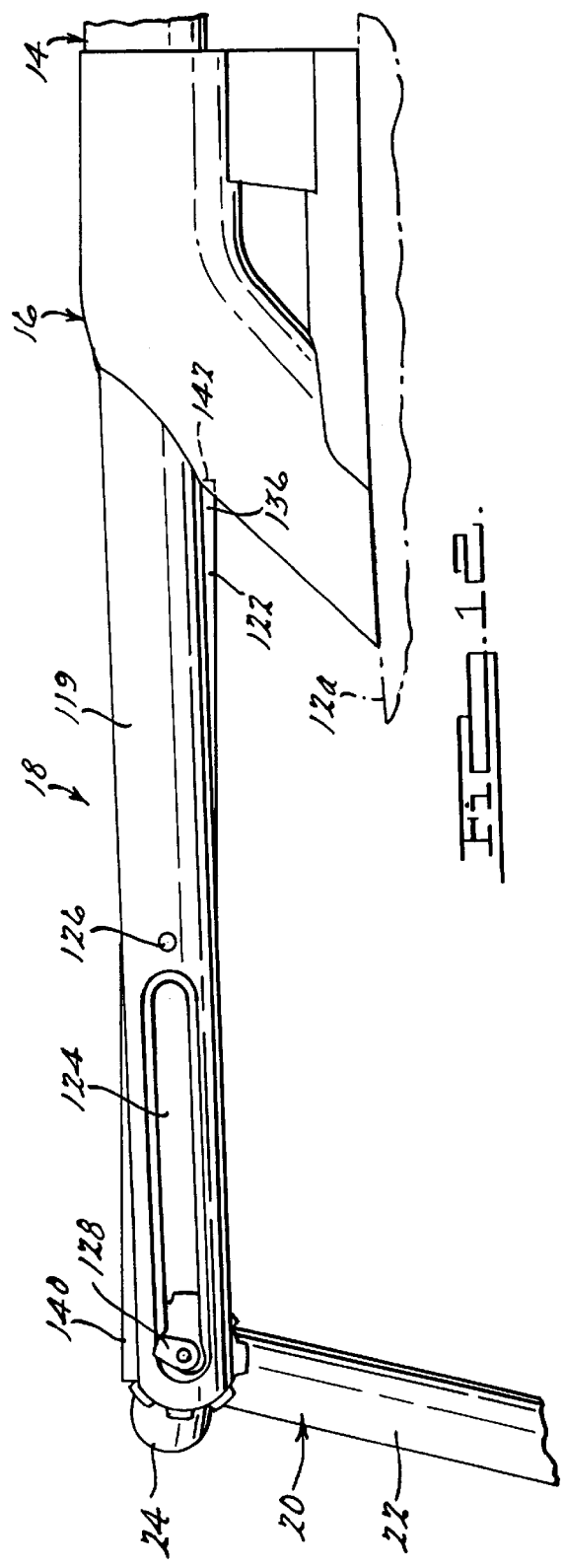
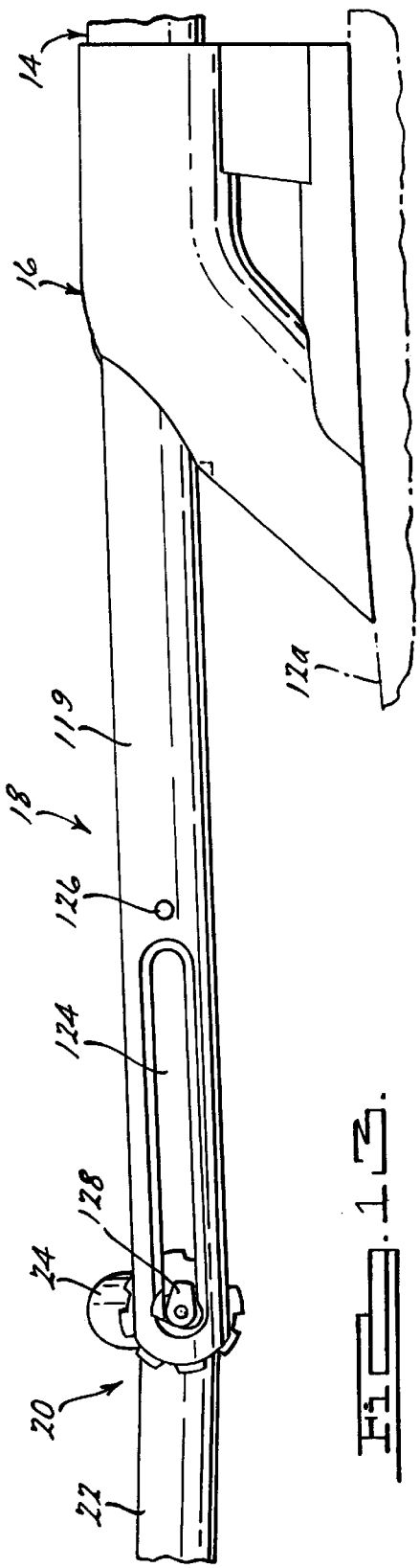

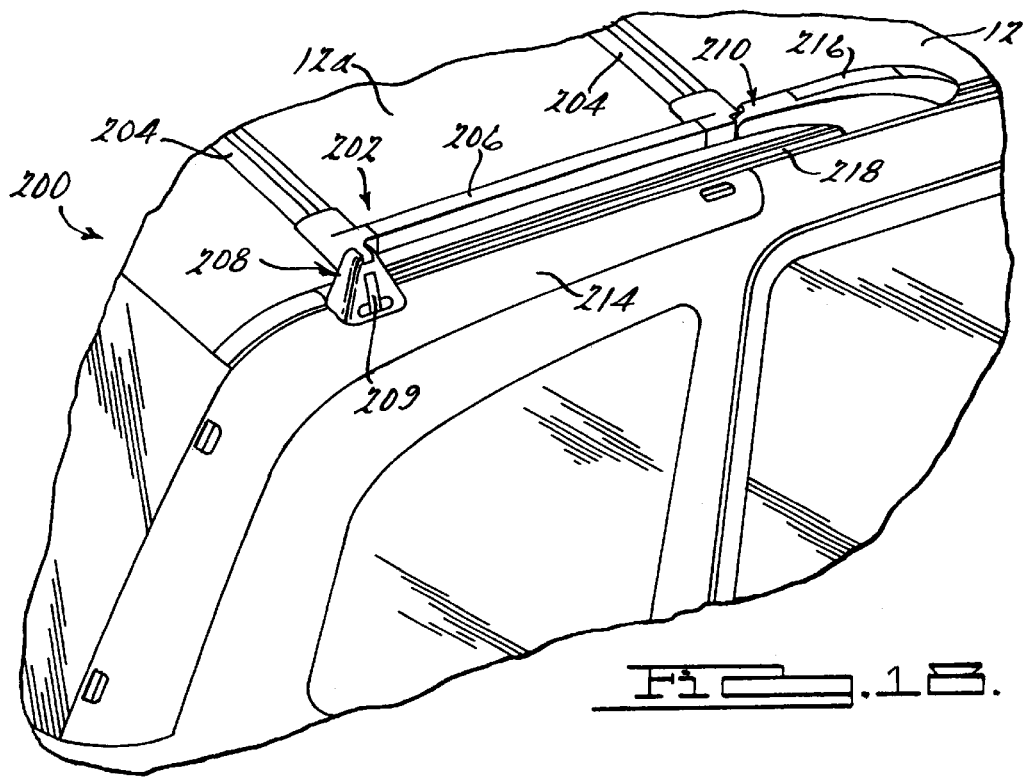
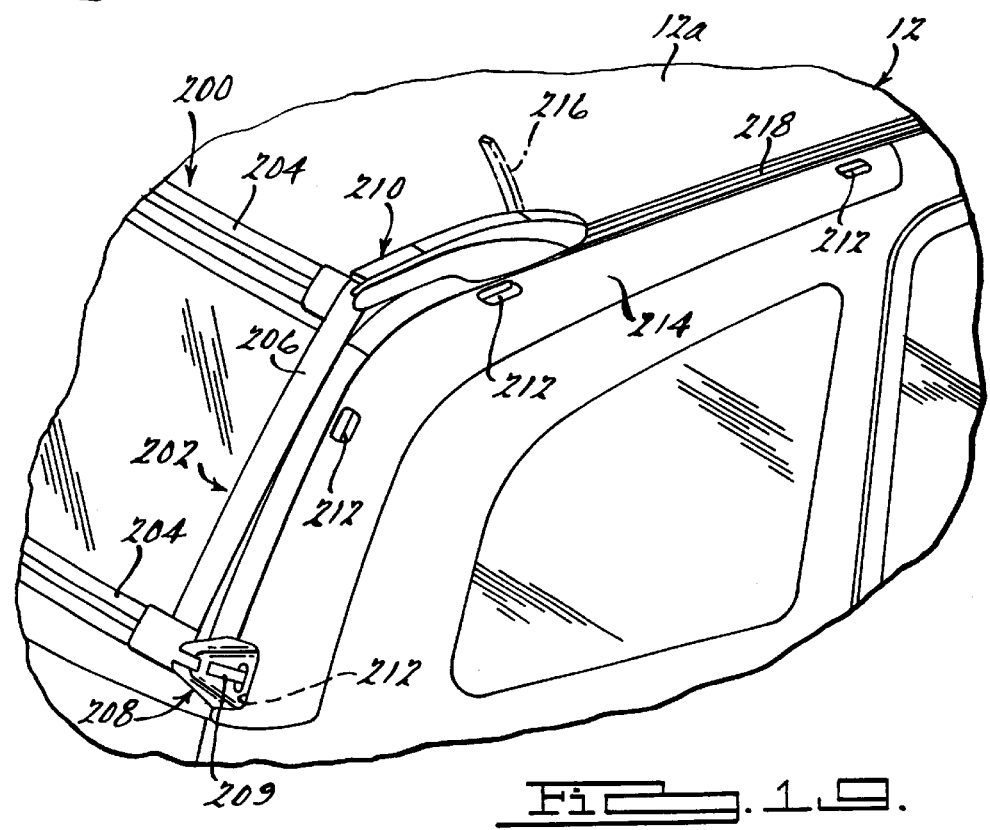

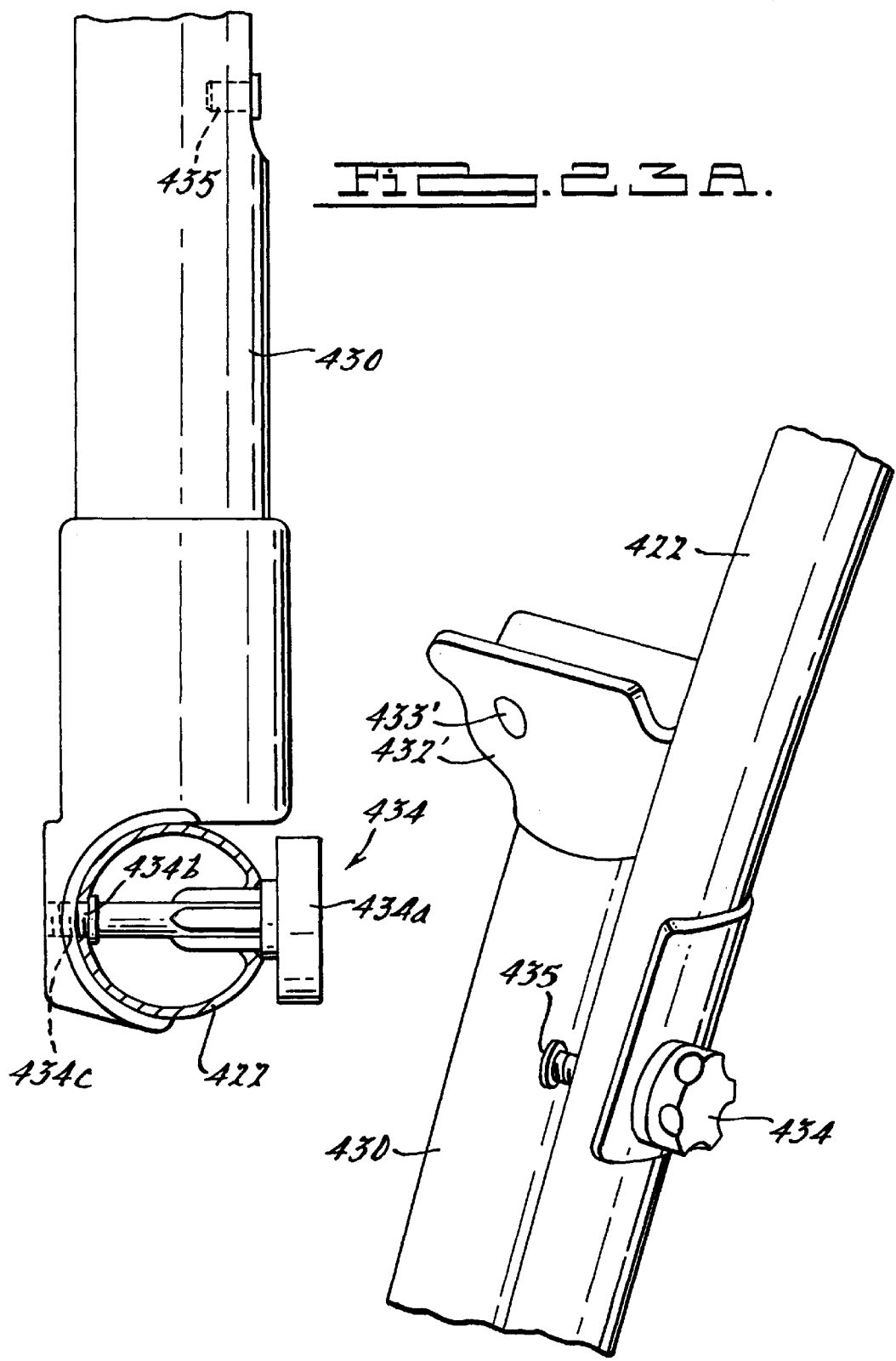

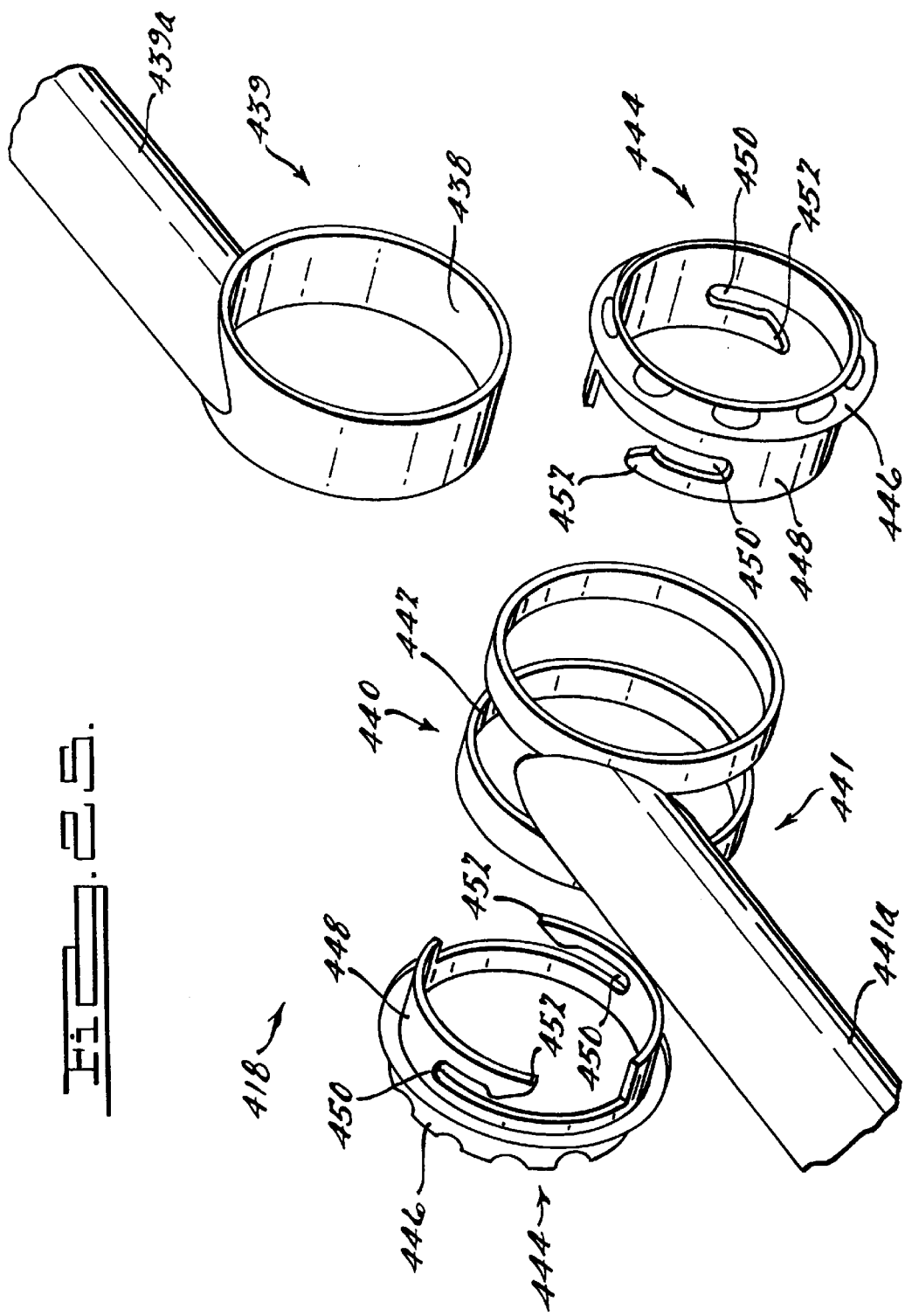

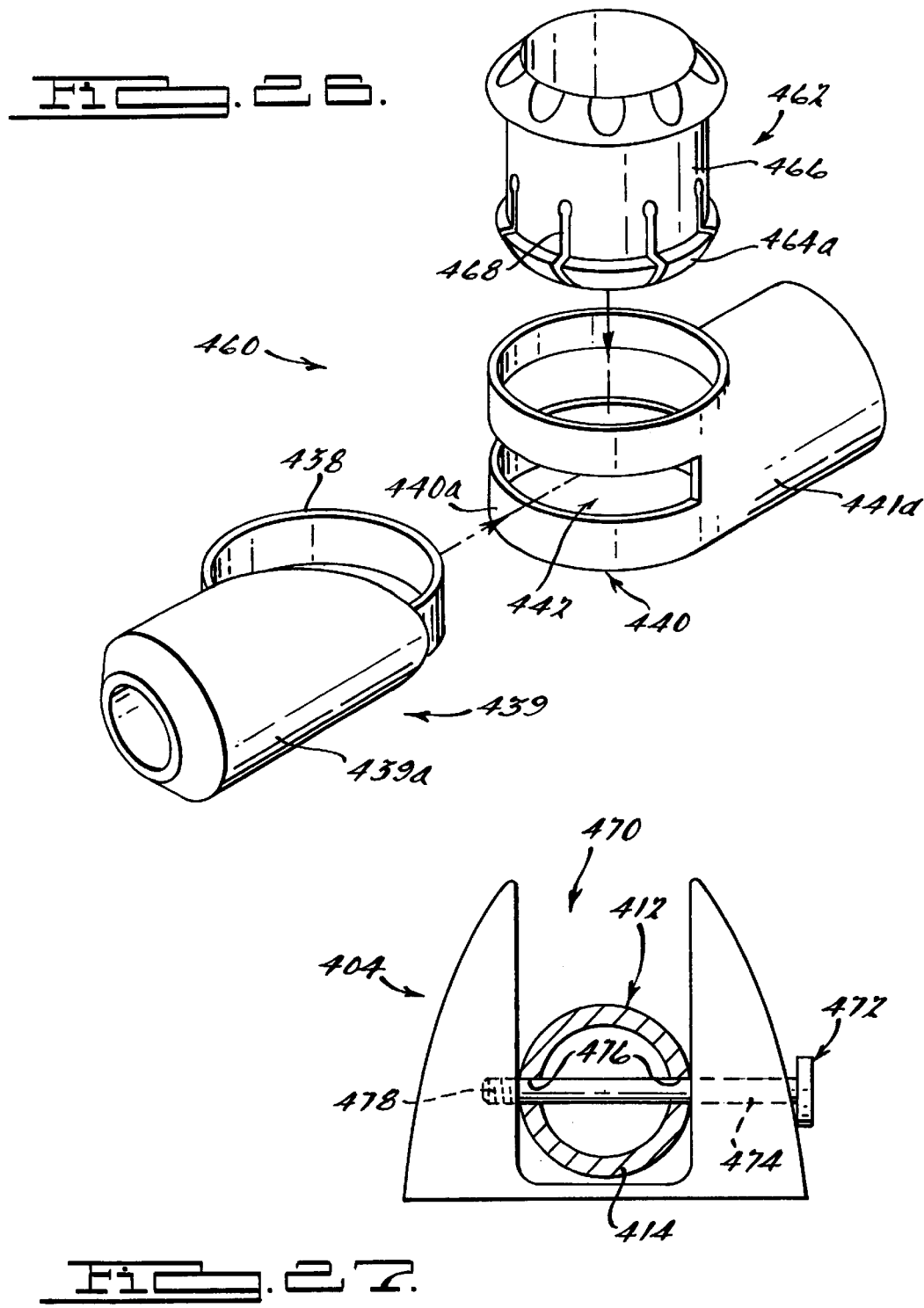

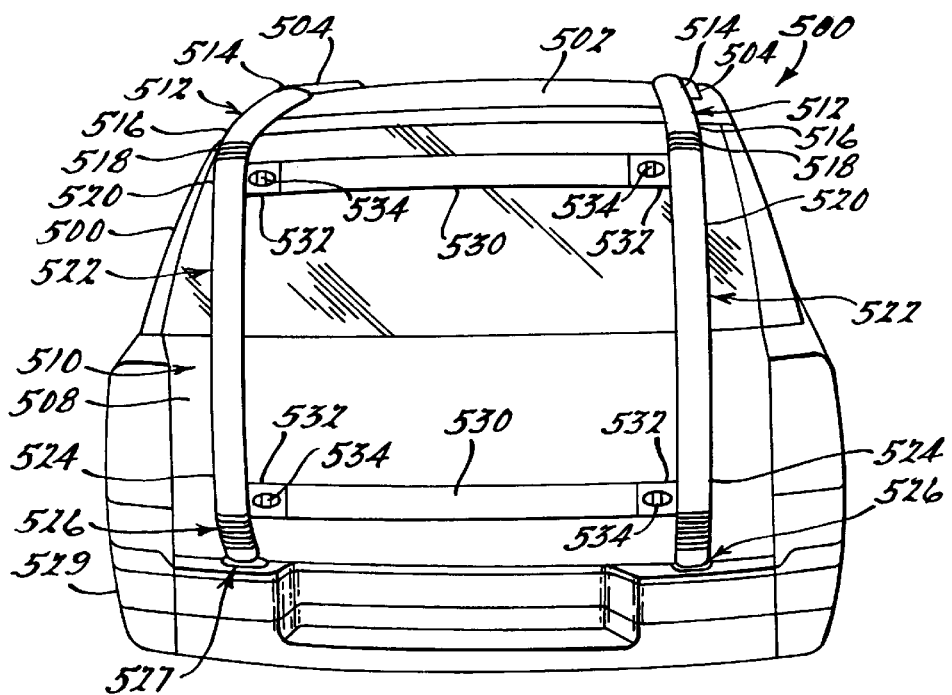
FIG. 30.
FIG. 32.
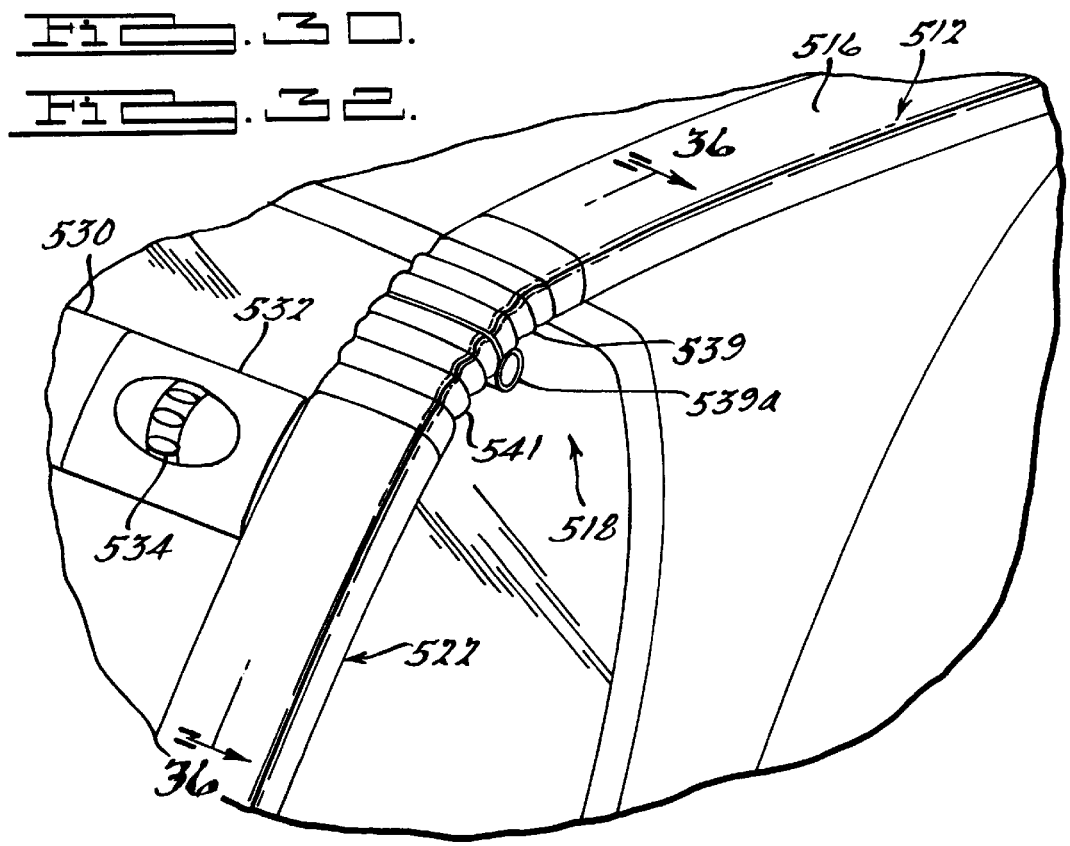

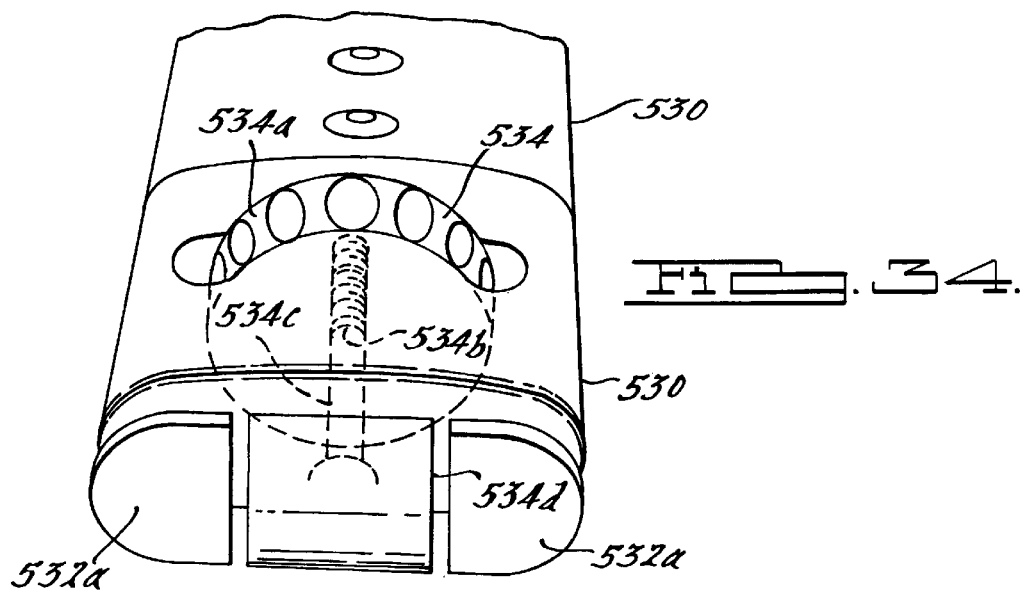
FIG. 34.
FIG. 35.
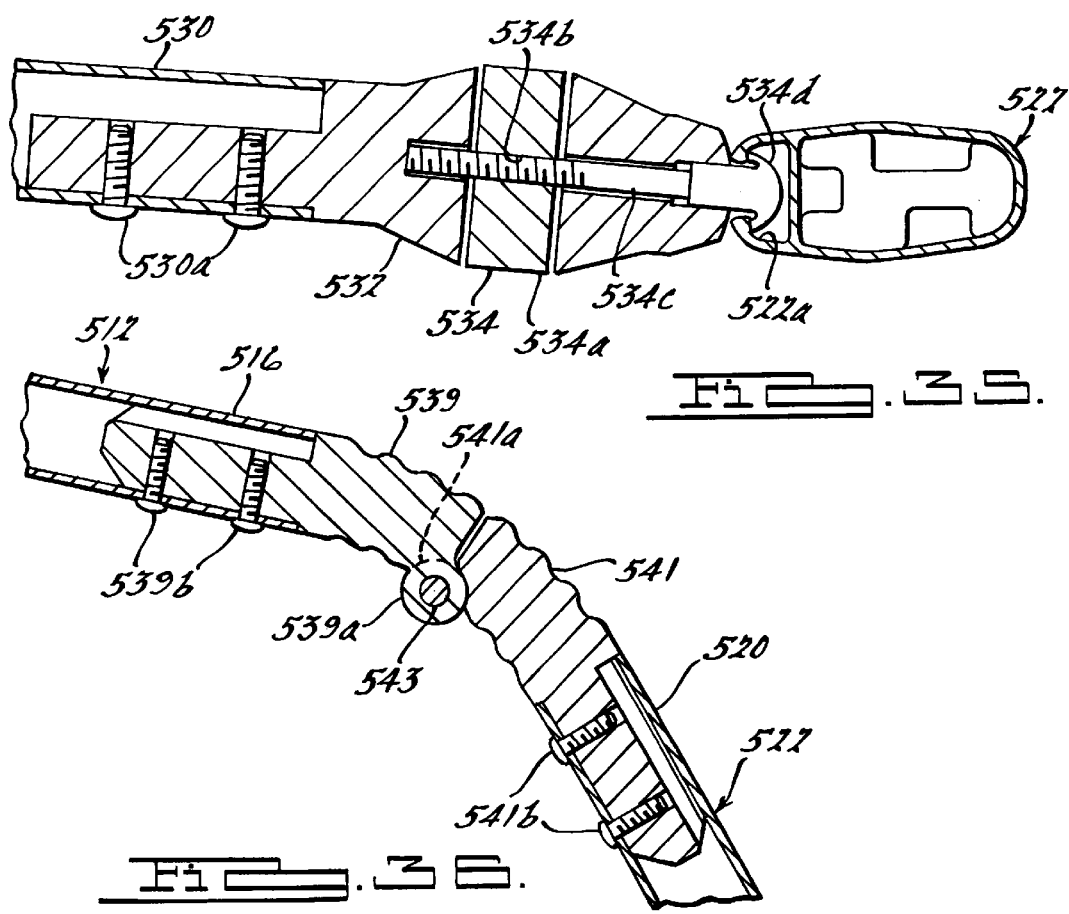
FIG. 36.

VEHICLE ARTICLE CARRIER FOR SUPPORTING ARTICLES ADJACENT A LIFTGATE OF A VEHICLE

CROSS-REFERENCE TO RELATED APPLICATIONS

This application is a continuation-in-part of U.S. patent application Ser. No. 10/137,696, filed on May 2, 2002, which claims benefit to U.S. Provisional Application No. 60/352,147, filed Oct. 29, 2001 and is a continuation-in-part of U.S. patent application Ser. No. 09/698,761, filed on Oct. 27, 2000, and issued as U.S. Pat. No. 6,516,984 on Feb. 11, 2003, which is a continuation-in-part of U.S. patent application Ser. No. 09/528,765, filed on Mar. 17, 2000 and issued as U.S. Pat. No. 6,338,427 on Jan. 15, 2002. The disclosures of the above applications are incorporated herein by reference.

FIELD OF THE INVENTION

This invention generally relates to vehicle article carrier systems and, more particularly, to a multi-position vehicle article carrier system having a cargo supporting structure capable of being secured over a liftgate of a vehicle.

BACKGROUND OF THE INVENTION

Vehicle article carriers are used in a wide variety of vehicles to support cargo and various other articles above an outer body surface, such as a roof portion, of a vehicle. Typically, such systems include a pair of side rails or slats which are fixedly secured to the roof portion of the vehicle. Usually a pair of cross bars are secured to the side rails or slats to extend transversely therebetween. The cargo is then positioned on the cross bars and secured down via suitable securing straps or bungee cords so that the cargo is held securely on the article carrier while the vehicle is in use.

One drawback with any conventional vehicle article carrier system is the occasional difficulty of lifting cargo and other articles to be transported up onto the roof portion of the vehicle. This is particularly so if the vehicle is a sport utility vehicle or a mini van, in which case the roof thereof is often at a height which is higher than many individuals can reach easily when attempting to lift cargo onto the article carrier. Removing cargo from the vehicle article carrier can often be just as difficult depending, of course, on the specific cargo, its dimensions and its weight.

Some attempts have been made to overcome this problem by providing a vehicle article carrier which has some form of movable load supporting structure which can be disposed in a temporary position in which cargo can be more easily loaded thereunto. Such systems, for example, are illustrated in U.S. Pat. Nos. 5,649,655; 5,505,579; and 5,417,358.

The systems illustrated in the above-mentioned patents typically suffer from one or more drawbacks. Often, such systems are complex to manufacture, and therefore costly. With some such devices, they cannot be left in a "lowered" position, but rather must be maintained in a retracted position on top of the vehicle roof. Some also do not allow for convenient opening of the liftgate of a vehicle when the cargo supporting portion is in its lowered position.

Yet another drawback with such pre-existing article carrier systems as described above is the inability to remove the cargo supporting portion of the system when it is not needed. It would also be advantageous to be able to collapse the removed cargo supporting portion into a compact arrangement that could be stored in a duffle bag or other like implement and then stored in a garage, or even in the vehicle from which it was removed.

Accordingly, there exists a need in the relevant art to provide a vehicle article carrier having a cargo supporting structure which can be secured over the liftgate of a vehicle to thus allow cargo to be secured thereto without a user having to stand on a ladder or other implement, as with conventional roof mounted article carrier systems. Furthermore, there exists a need in the relevant art to provide a vehicle article carrier in which a cargo supporting structure is used to support cargo adjacent a liftgate of a vehicle, and which also permits the liftgate to be lifted and lowered without interference from the article carrier, and further which does not add an appreciable amount of weight to the liftgate. Still further, there exists a need in the relevant art to provide a vehicle article carrier having a cargo supporting structure which is mounted over a liftgate of a vehicle, and where the cargo supporting structure can be quickly and easily detached from the vehicle when the cargo supporting structure is not needed, and which can further be collapsed into a compact arrangement for storage.

SUMMARY OF THE INVENTION

According to the principles of the present invention, an article carrier adapted to hold cargo and other articles adjacent a liftgate of a vehicle such as a sport utility vehicle, a station wagon, or minivan is provided having an advantageous construction. The article carrier includes a liftgate striker connectable to the liftgate of the vehicle and a bumper striker connectable to the bumper of the vehicle. A first link is pivotally connected to the roof support structure of the motor vehicle and a second link is pivotally coupled to the first link. A locking assembly is coupled to the second link and is operable in a closed position to couple the second link to the bumper striker. In an opened position, the locking assembly releases the bumper striker in response to contact from the liftgate striker to enable the quick and convenient raising of the liftgate without the need to first unlatch the article carrier from the bumper.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a plan view of the apparatus of FIG. 1 showing the apparatus in a second position in which a cargo supporting structure thereof is disposed over the roof portion of the vehicle;

FIG. 4 is a perspective view of one of the latching assemblies secured to a support beam on the rear bumper of the vehicle of FIG. 1;

FIG. 5 is a cross sectional side view of the free end of the cargo supporting structure secured to the latching assembly, taken in accordance with section line 5—5 in FIG. 1;

FIG. 6 is a cross sectional side view of the latching assembly of FIG. 5 with the lower locking assembly of the cargo supporting structure unlatched therefrom and ready to be lifted away from the bumper;

FIG. 6a is a fragmentary side, cross-sectional view of the latching lever of FIG. 5 engaging the latching assembly as the latching lever is urged into the latching assembly;

FIG. 7 is a perspective fragmentary view of a portion of the torque rod assembly of the cargo supporting structure illustrating one of the lower locking assemblies at one end of the torque rod assembly;

FIG. 8 is a cross sectional view of a portion of the torque rod assembly shown in FIG. 7 taken in accordance with section line 8—8 in FIG. 7;

FIG. 9 is a cross sectional view of the torque rod assembly taken in accordance with section line 9—9 in FIG. 8;

FIG. 10 is a plan view of the rear portion of one of the side rails also showing the articulating assembly and a small portion of the cargo supporting structure;

FIG. 11 is a perspective view of the articulating assembly and the rearmost end portion of one of the side rails;

FIG. 11a is a plan view of an end portion of the articulating assembly illustrating the pair of rollers that are used for enabling rolling movement of the articulating assembly along its associated side rail;

FIG. 12 is a side view of the articulating assembly when the cargo supporting structure is disposed in the lowered position shown in FIG. 1;

FIG. 13 is a side view of the articulating assembly when the cargo supporting structure is moved into the intermediate position shown in FIG. 2;

FIG. 14 is a cross sectional side view of the articulating assembly in accordance with section line 14—14 in FIG. 10, when the cargo supporting structure is in the lowered position of FIG. 1;

FIG. 15 is a cross sectional side view of the articulating assembly of FIG. 14 with the cargo supporting structure raised into the intermediate position of FIG. 2;

FIG. 18 is a perspective view of an alternative preferred embodiment of the present invention;

FIG. 19 is a perspective view of the article carrier of FIG. 18 with the cargo supporting structure thereof in a lowered position;

FIG. 23A is a cross sectional end view taken in accordance with section line 23A—23A in FIG. 22;

FIG. 24 is a perspective view of a portion of one of the main support members showing one of the cross bars secured thereto in a storage arrangement when the article carrier is not being used and is removed from the vehicle;

FIG. 25 is an exploded perspective view of the components comprising the upper pivot assembly;

FIG. 26 is a perspective view of an alternative embodiment of the pivot assembly;

FIG. 27 is an end view of one of the supports showing a portion of one of the upper coupling links pivotally coupled thereto;

FIG. 30 is a perspective view of a rear portion of a vehicle illustrating a yet another embodiment of a multi-position, articulating, article carrier apparatus in accordance with the present invention secured to the outer body surface of the vehicle with the apparatus in a first or lowered position;

FIG. 31 is a side cross sectional view of the apparatus of FIG. 30, with portions removed for clarity;

FIG. 32 is an enlarged perspective view of an alternative embodiment of the pivot assembly;

FIG. 34 is an enlarged perspective view, with portions hidden, of the end of an alternative embodiment of the cross member;

FIG. 35 is a side cross sectional view of the alternative embodiment of the cross member;

FIG. 36 is a side cross sectional view of the alternative embodiment of the pivot assembly, taken in accordance with section line 35—35 of FIG. 32;

DETAILED DESCRIPTION OF THE PREFERRED EMBODIMENTS

The following description of the preferred embodiments is merely exemplary in nature and is in no way intended to limit the invention, its application, or uses.

Figure 1:
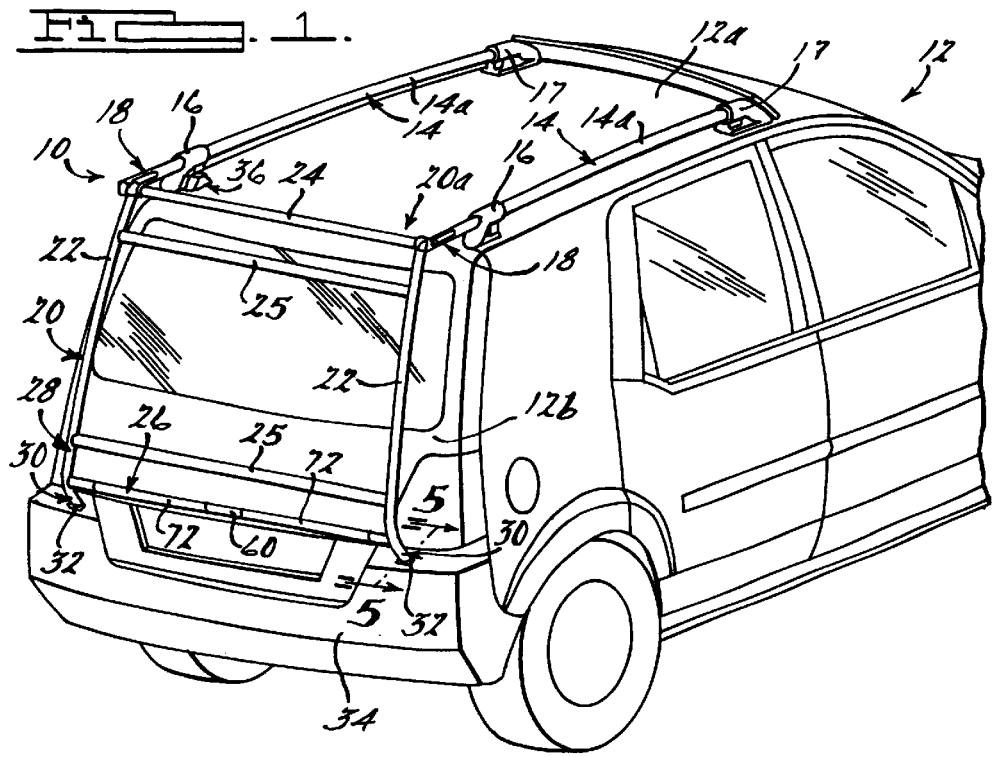
FIG. 1 is a perspective view of a rear portion of a vehicle illustrating a first embodiment of a multi-position, articulating, article carrier apparatus in accordance with the present invention secured to the outer body surface of the vehicle, with the apparatus in a first or lowered position.

Referring to FIG. 1 there is shown a multi-position, articulating, vehicle article carrier apparatus 10 in accordance with a first embodiment of the present invention. The apparatus 10 is shown secured to a roof portion 12a of a motor vehicle 12. While the motor vehicle 12 is illustrated as a sport utility vehicle (SUV), it will be appreciated that the apparatus 10 could also be used with minivans, station wagons, and a wide variety of other vehicles, and is therefore not limited to use with any particular type of vehicle.

The apparatus 10 includes a pair of side rails 14 which are adapted to be fixedly secured to the roof portion 12a of the vehicle 12. Each side rail 14 includes a rear support 16 and a front support 17 which support a main portion 14a of the side rail 14 above the roof portion 12a. Each of the main portions 14a of each side rail 14 comprise C-shaped channels.

A pair of articulating mechanisms 18 are engaged with the side rails 14 so as to be movable along each of the side rails 14. The articulating mechanisms 18 are pivotally secured to a cargo supporting structure 20. The cargo supporting structure 20 includes a frame comprised of side members 22, a transversely extending top frame member 24 and an actuator bar assembly 26. At least one cross bar 25, and more preferably a pair of cross bars 25, are disposed on the cargo supporting structure 20 to extend between the side members 22. The cross bars 25 may be fixedly secured to the side members 22 or clamping assemblies or other means may be employed to permit adjustable positioning of the cross bars 25 along the side members 22. Securing straps such as bungee cords may be used to secure cargo on the cross bars 25.

A lower or free end 28 of the cargo supporting structure 20 includes a pair of lower locking assemblies 30. These lower locking assemblies 30 are each adapted to latch with a corresponding pair of latching assemblies 32 disposed within a rear bumper 34 of the vehicle 12.

Figure 2:
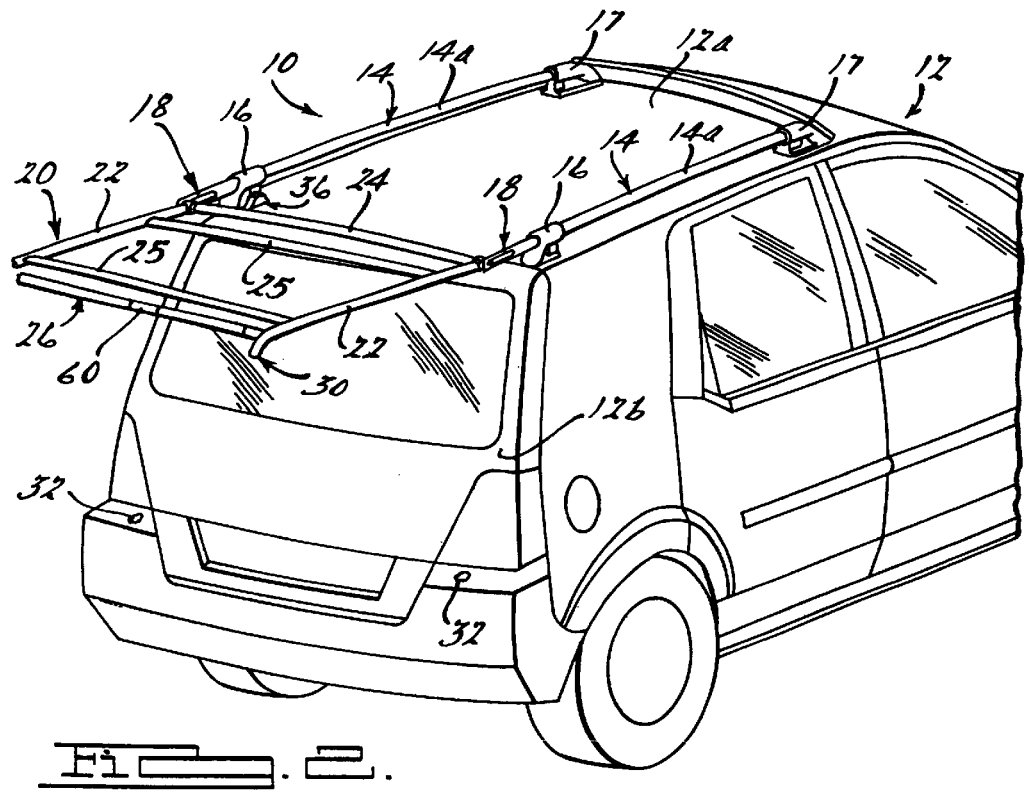
FIG. 2 is a view of the apparatus and vehicle shown in FIG. 1 with the apparatus disposed in an intermediate position about to be urged over a roof portion of the vehicle.
Figure 16:
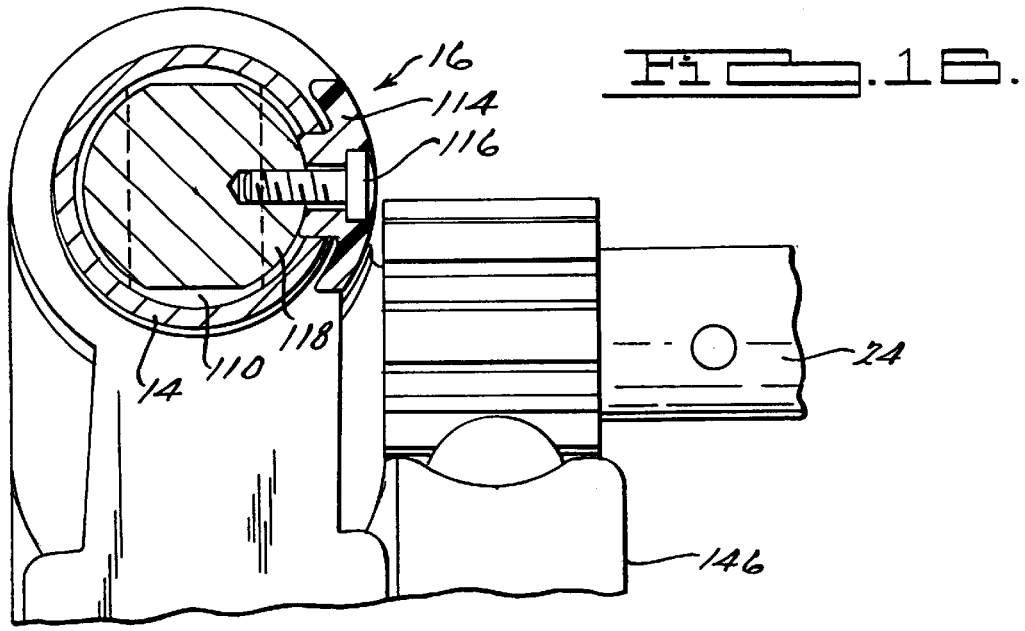
FIG. 16 is a partial cross sectional view of the side rail taken in accordance with section line 16—16 in FIG. 11.

Referring to FIGS. 1-3, the apparatus 10 can be secured in a first or lowered position disposed over a liftgate 12b, as shown in FIG. 1. In this position cargo can be carried on the cargo supporting structure 20 through the use of suitable fastening straps or bungee cords or like components which secure the cargo to the cross bars 25. In FIG. 2, the cargo supporting structure 20 is shown after same has been raised into an intermediate position. This is accomplished by a user actuating the actuator bar assembly 26 to release the lower locking assemblies 30 from the latching assemblies 32, and then lifting upwardly on the free end 28 of the cargo supporting structure 20. FIG. 3 shows the cargo supporting structure 20 after same has been slid forwardly over the roof portion 12a of the vehicle 12. In this position the lower locking assemblies 30 can be locked to a corresponding pair of upper locking assemblies 36 associated with the two rear supports 16.

Referring now to FIGS. 4 and 5, one of the latching assemblies 32 is shown. The latching assembly 32 includes a main body portion 38 and a latching door 40 pivotally secured by a pivot pin 42 to the main body portion 38. The latching door 40 includes a lower end 44 which is biased by a spring 46 secured to a transversely extending pin 50. Thus, the latching door 40 is constantly biased into the closed position shown in FIG. 4. A base portion 52 allows the main body portion 38 to be secured to a structural frame member 54 disposed within the bumper 34. The base portion 52 is preferably secured to the structural member 54 by a plurality of threaded fastening members 58 extending through apertures 52a in the base portion 52. An upper wall 56 of the main body portion 38 sits generally flush with an upper outer surface of the bumper 34 to present an aesthetically pleasing appearance whether or not the cargo supporting structure 20 is in the lowered position shown in FIG. 1.

Referring now to FIGS. 7-9, the actuator bar assembly 26 will be described. Referring specifically to FIGS. 7 and 8, the actuator bar assembly 26 includes a centrally disposed, manually graspable and rotatable member 60. Rotatable member 60 is disposed over a first sleeve portion 62 and supported by a pair of support rings 64 which are also disposed over the first sleeve 62. The first sleeve 62 extends completely to each opposite end 66 of the actuator bar assembly 26 and is secured by at least one fastening member 68 within an end cap portion 70. A free wheeling sleeve 72 is disposed on each side of the rotatable sleeve 60 in between one of the supports 64 and one of the end cap portions 70. The free wheeling sleeve 72 rotates freely while being grasped when the free end 28 of the cargo supporting structure 20 is lifted from the lowered position of FIG. 1 into the intermediate position of FIG. 2.

With further reference to FIGS. 8 and 9, the rotatable sleeve 60 is secured to a torque rod 76 via a threaded member 74 which extends into a threaded bore 76a in the torque rod 76. A spacer sleeve 78 (also shown in FIG. 7) also receives the threaded member 74 therethrough. The first sleeve 62 includes a slot 80 extending over an arc of slightly greater than 90?. Slot 80 permits the rotatable sleeve 60 and the threaded member 74 to be rotated without interference from the first sleeve 62. Thus, when the rotatable sleeve 60 is rotated, this rotational movement is transmitted to the torque rod 76.

With specific reference to FIG. 7, each opposite end of the torque rod 76 includes a half moon shaped protrusion 82 which forms a camming surface 82a. Camming surface 82a is used to control locking and unlocking of its associated lower locking assembly 30, which will be described momentarily. It will thus be appreciated that the actuator bar assembly 26 allows an unlocking action to be effected which releases the two lower locking assemblies 30, simultaneously from their respective latching assemblies 32 simply through a short twisting motion of the rotatable sleeve 60. Thus, unlocking of the actuator rod assembly 26 from the lower locking assemblies 32 can be effected with only one hand of a user and with a simple, short and convenient rotational movement of the rotatable sleeve 60.

Referring now to FIGS. 5-7, the construction and operation of one of the pair of lower locking assemblies 30 will be described. Each lower locking assembly 30 includes a latching lever 84 having an upper end 86 and a lower end 88. The latching lever 84 is pivotally mounted via a pivot pin 90 which extends through an aperture 92 in the lever 84 and also through a main body portion 94 which partially encloses the latching lever 84.

With specific reference to FIG. 5, a spring 96 is disposed against an inside surface 22a of a tubular portion 22b of the side member 22, and extends through an opening 100 in the main body portion 94 into a notch 98 formed in the latching lever 84. The spring 96 biases the lower end 88 of the latching lever 84 upwardly into a closed or latched position, which is shown in FIG. 5.

With reference to FIGS. 5, 6 and 7, when the rotatable sleeve 60 is grasped with one hand and rotated, the camming surface 82a of the protrusion 82 rotates to urge the upper end 86 of the latching lever 84 pivotally about the pivot pin 90. As the latching lever 84 rotates, the lower end 88 thereof is drawn away from the upper wall 56 of the latching assembly 32 (FIG. 6). This allows a lip portion 102 of the latching lever 84 to be drawn out of a notch 104 formed in an undersurface of the upper wall 56. While the rotatable sleeve 60 is held in the rotated position, the user lifts the free end 28 of the cargo supporting structure 20 upwardly and away from the latching assembly 32.

When the free end 28 of the cargo supporting structure 20 is lowered into latching engagement with the latching assemblies 32, no rotational movement of the rotatable sleeve 60 is required for proper latching of the lower locking assemblies 30 to occur. As the lower end 88 of each latching lever 88 contacts its respective latching door 40, an edge portion 94a of the main body portion 94 engages the latching door 40 and urges this component downwardly into the position shown in FIGS. 5 and 6. Referring to FIG. 6a, further lowering movement of the cargo supporting structure 22 causes the lip portion 102 to engage an interior edge 106 of the upper wall 56. Further lowering movement causes the lip 102 to ride over the interior edge 106 before snapping into engagement in the notch 104 (FIG. 5).

Referring now to FIGS. 10–15, the construction and operation of the articulating mechanisms 18 will be described. With initial reference to FIGS. 10, 11 and 11a, each articulating mechanism 18 includes a pair of rollers 110 which are pivotally secured via axles 112 within cut-outs 119a of a support bar 119. The support bar 119 is sized so as to be able to fit within a C-shaped channel 14b of the side rail 14 and through a C-shaped channel 116a (FIG. 11) in the rear support 16. During assembly, the articulating mechanism 18 is inserted through the C-shaped channel 116a in the rear support 16 and a stop member 114 is secured to the support bar 119 via a threaded member 116. The stop member 114 prevents the articulating mechanism 18 from being withdrawn beyond a predetermined point from its respective side rail 14.

With further reference to FIGS. 11 and 14, the support bar 119 includes a slot 120 formed therein within which is disposed a locking bar 122. The locking bar 122 is pivotally mounted at a central aperture 123 by a pivot pin 126 extending through the support bar 18. An elongated, linear slot 124 is also formed in the support bar 18. This slot 124 further includes a relief portion 124a to allow clearance for a cam lobe 128. The slot 124 may vary in length, but in one preferred form is between about six-nine inches.

With reference to FIGS. 14 and 15, a threaded member 132 extends through an opening 134 in a first end 136 of the locking bar 122. The threaded member 132 captures a biasing member 138 within the opening 134. Biasing member 138 serves to provide a constant biasing force which tends to bias the first end 136 of the locking bar 122 upwardly into the position shown in FIG. 15.

With reference to FIGS. 10 and 14, the top frame member 24' includes an axle portion 24a at each end thereof. The axle portions 24a each have attached thereto at their outermost ends one of the cam lobes 128. Thus, the axle portions 24a pivotally support the cargo supporting structure 20 from the articulating mechanisms 18. Importantly, the axle portions 24a also are able to slide within the elongated slots 124 when the cargo supporting structure 20 is moved from the intermediate position of FIG. 2 to the position shown in FIG. 3.

Referring now to FIGS. 12, 13, 14 and 15, when the cargo supporting structure 20 is in the lowered position shown in FIG. 1, the side members 22 are disposed in the position shown in FIG. 12. In this position the cam lobe 128 is engaged in the relief portion 124a, as illustrated in FIG. 14. This allows the cam lobe 128 to lift a second end 140 of the lock bar 122 which causes the first end 136 to project outwardly of the support bar 119. The first end 136 abuts a notch 142 formed in the rear support 16 which prevents the articulating mechanism 18 from moving inadvertently towards and into the support member 16 when the cargo supporting structure 20 is in the lowered position of FIG. 1. Thus, when in the lowered position shown in FIG. 1, the cargo supporting structure 20 is fixedly disposed. Its upper end 20a cannot be pulled outwardly away from the upper supports 16 because of abutting engagement of the stop members 114 with their respective supports 16. Abutting engagement of the first end 136 of each locking bar 122 with the notch 142 of each support 16 prevents the upper end 20a from being pushed in toward the side rails 14. Accordingly, cargo supported on the cross bars 25 of the cargo supporting structure 20 can be supported just as securely with the structure 20 in the lowered position as when the structure 20 is disposed over the roof portion 12a of the vehicle 12.

When the cargo supporting structure 20 is lifted into the intermediate position shown in FIG. 2, the cam lobe 128 rotates in accordance with rotational movement of the top frame member 24 (FIG. 1) into the position shown in FIG. 13. This rotation of the cam lobe 128 allows the spring 138 to bias the first end 136 of the locking bar 122 upwardly into the position shown in FIG. 15. In this position the locking bar 122 is now able to clear the notch 142. Accordingly, the entire articulating mechanism 18 may be urged forwardly (i.e., to the right in the drawings of FIGS. 12–15) through the C-shaped channels 16a in each of the rear supports 16. This unlocking action is further accomplished automatically by simply raising the free end 28 of the cargo supporting structure 20 into the intermediate position shown in FIG. 2.

Once the individual has raised the cargo supporting structure 20 into the position shown in FIG. 2, the entire cargo supporting structure can be pushed forwardly until the structure 20 is positioned over the roof portion 12a of the vehicle 12. During the initial six-nine inches of forward travel, the axle portions 24a slide forwardly within the elongated slots 124 before contacting forward ends 124b of the slots 124. This six-nine inches of "travel" provides the distance necessary to place the pivot axis defined by the axle portions 24a sufficiently behind the vehicle 12 so that the vehicle 12 does not interfere with lowering pivotal movement of the cargo supporting structure 20.

Another important advantage of the articulating mechanisms 18 is that they effectively allow the top frame member 24 to be positioned rearward of the pivot axis of the liftgate 12b of the vehicle 12 such that the cargo supporting structure 20 can be lifted with the liftgate 12b without first having to place the structure 20 over the roof portion 12a of the vehicle 12. Thus, access can easily be gained to the rear of the vehicle 12 once the cargo supporting structure 20 and liftgate 12b are both in the raised position.

Figure 17:
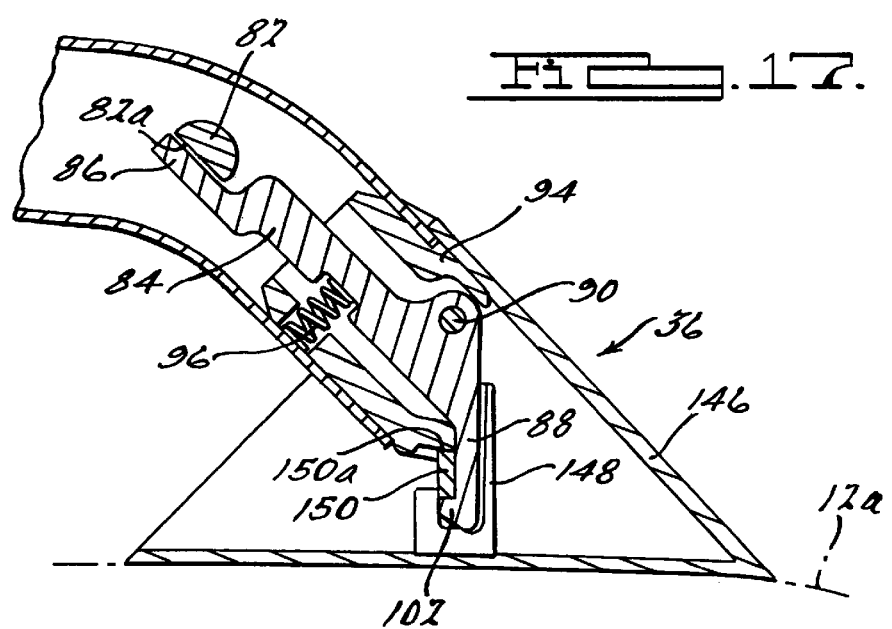
FIG. 17 is a cross sectional side view of the upper locking assembly of one of the rear supports, taken in accordance with section line 17—17 in FIG. 3.

Referring now to FIGS. 11 and 17, the securing of one of the lower locking assemblies 30 to one of the upper locking assemblies 36 (also shown in FIG. 3) will be described. Each of the upper locking assemblies 36 comprises a housing 146 which is preferably integrally formed with an associated one of the rear supports 16. Within the housing 146 is upstanding structure 148 and a transversely extending latch member 150. When the cargo supporting structure 20 is to be secured over the roof portion 12a of the vehicle 12, it is urged into position over the roof portion 12a such that the lower locking assembly 30 is over, but slightly forwardly, of the upstanding structure 148. The locking assembly 30 can then be lowered into an interior area of the housing 146. As the lower locking assembly 30 is lowered into the interior area of the housing 146, the lip portion 102 of the latch lever 84 contacts an upper edge 150a of the transversely extending latch member 150 and pivots slightly against the biasing force of the spring 96 so as to clear the edge 150a. The lip portion 102 then latches under the latch structure 150. In the position shown in FIG. 17, the lower locking assembly 30 is secured against movement.

Unlocking of the lower locking assembly 30 is accomplished by a user grasping and rotating the rotatable sleeve 60, which causes the latching lever 84 to pivot counterclockwise in the drawing of FIG. 17. While holding the rotatable sleeve 60 in its rotated position against the biasing force of spring 96, the user may then push the entire cargo supporting structure 20 forwardly just slightly before lifting the free end 28 of the structure 20 and then pulling same away from the vehicle 12 into the position shown in FIG. 2. Accordingly, unlatching of the cargo support structure 20 from the position shown in FIG. 3 can be accomplished by the user merely grasping the rotatable sleeve 60 and, from a single position behind the vehicle 12, articulating the actuator bar assembly 26 to clear the upper locking assembly 36. Thus, there is no need for the user to separately unlock each of the lower locking assemblies 30. This significantly adds to the convenience and ease in using the apparatus 10.

From the foregoing description, it will be appreciated that the apparatus 10 of the present invention provides an articulatable article carrier assembly which enables cargo to be carried either in a generally horizontal position over the liftgate of a vehicle, or on top of the vehicle, depending upon the user's preference. The apparatus 10 of the present invention significantly eases the manner with which cargo may be loaded, since the cargo need not be positioned directly on top of the vehicle 12 but rather on the cross bars 25 while the cargo supporting structure 20 is disposed over the liftgate 12b. In this regard, it will be appreciated that one or both of the cross bars 25 could include perpendicularly extending portions which serve to temporarily support cargo which is positioned on the cross bars 25 when the cargo supporting structure 20 is in the lowered position shown in FIG. 1. The apparatus 10 can further be locked and unlocked from the position shown in FIGS. 1–3 with a simple, single movement of the rotatable sleeve 26, which thus serves to significantly enhance the ease with which the cargo supporting structure 20 can be moved between its various positions.

Referring now to FIGS. 18 and 19, an alternative embodiment 200 of the multi-position, articulating, vehicle article carrier apparatus is illustrated. The apparatus 200 includes a cargo supporting structure 202 comprising a pair of cross bars 204 and a pair of side members 206 (only one being visible). With the apparatus 200, however, a pair of rear supports 208 and a pair of front, supports 210 are used to support the cargo supporting structure 202 above the outer body surface 12a of the vehicle 12. Each rear support 208 includes a suitable latching structure which can be actuated through opening and closing of a pivoting lever 209 to engage a suitably shaped cavity 212 (FIG. 19) in an outer body surface portion 214 of the vehicle 12. The front-supports 210 each include a latching structure therein which can be locked and unlocked via a liftable locking lever 216 (shown in phantom in the lifted position in FIG. 19).

When the apparatus 200 is in the position shown in FIG. 18, the cargo supporting structure 202 is disposed over the roof portion 12a of the vehicle 12. The internal locking structure within the front supports 210 secures the front supports to conventional slats 218 which are fixedly secured to the roof portion 12a of the vehicle 12, and which each include channels which captively hold portions of the front supports 210 to the slats 218. This construction for the slats and the interengagement of the front supports 210 with the slats 218 to permit sliding movement of the front supports 210 along the slats 218 is well known in the art. Patents of the assignee of the present application which disclose suitable constructions for the locking assembly of the front support 210, which could be utilized with little or no modifications, are U.S. Pat. Nos. 4,899,917; 4,972,983; 4,982,886; 5,385,285 and 5,579,970, which are all incorporated by reference herein. In FIG. 19, the cargo supporting structure 202 is shown disposed over the liftgate 12b of the vehicle 12. The rear supports 208 can be locked at one of a plurality of positions defined by cavities 212.

Figures 20, 21:
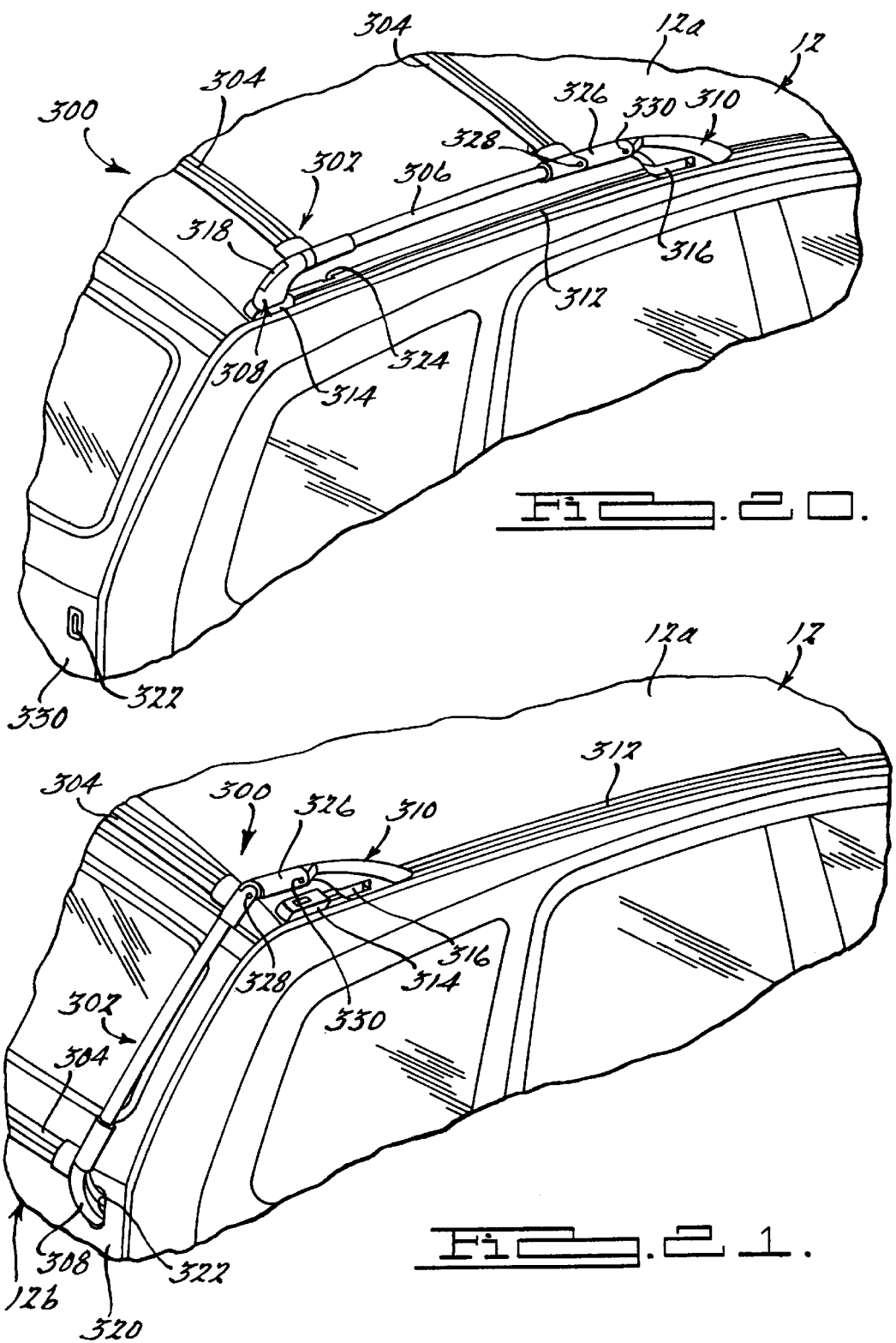
FIG. 20 is a perspective view of another alternative preferred embodiment of the present invention.
FIG. 21 is a perspective view of the article carrier of FIG. 20 with the cargo supporting structure thereof in the lowered position.

Referring now to FIGS. 20 and 21, a multi-position, articulating, vehicle article carrier 300 in accordance with yet another alternative embodiment of the present invention is shown. The apparatus 300 is similar to the apparatus 200 and includes a cargo supporting structure 302 comprised of a pair of cross bars 304 and a pair of side members 306 (only one being visible). The cargo supporting structure 302 is supported above the roof portion 12a of the vehicle 12 by a pair of rear supports 308 and a pair of front supports 310 (with only one of each support 308 and 310 being visible). The front supports 310 are disposed on conventional slats 312 such that the front supports 310 can be moved slidably along the slats. The slats 312 are fixedly secured to the roof portion 12a of the vehicle 12. Each slat 312 further includes a latching assembly 314 to which one of the rear supports 308 may be releasably secured.

To move the cargo supporting structure 302 from the position shown in FIG. 20 into the position shown in FIG. 21, the user first unlatches the front supports 310 by pulling outwardly on lever portions 316 of each of the front supports 310. This unlocks each front support 310 from its associated slat 312 and allows the front support 310 to be slid along its associated slat 312. Each rear support 308 is also unlatched from its associated latching assembly 314 by lifting a latching lever 318. The cross bar 304 extending between the rear supports 308 can then be lifted off of the latching assemblies 314, and the entire cargo supporting structure 302 pulled rearward so as to extend over the liftgate 12b. The rear supports 308 are then latched to suitable latching structures formed in the liftgate 12b at areas 322. The front supports 310 are then latched by closing the levers 316, which causes them to be locked on the slats 312 at the position shown in FIG. 21. If desired, notches 324 (one of which is shown in FIG. 20) could be formed in the slats 312 to define a specific position at which the front supports 312 must be placed in before same can be locked to the slats 312.

The apparatus 300 also provides a coupling member 326 associated with each front support 310 which provides two pivot points 328 and 330. These two points of rotation are needed because the point of rotation about which the liftgate 12b rotates is laterally offset of the point of rotation of the cargo supporting structure 302. This allows the cargo supporting structure 302 to be easily articulated, together with the liftgate 12b, as the liftgate 12b is lifted, and without the need to first unlock the front supports 310 or the rear supports 308. Thus the apparatus 10 can be lifted simultaneously from the position shown in FIG. 21 into an intermediate position, wherein the cargo supporting structure 302 extends generally horizontally outwardly from the roof portion 12a, such as in FIG. 2, before being pushed onto a position over the roof portion 12a, without any binding action occurring at the coupling member 326.

Figure 22:
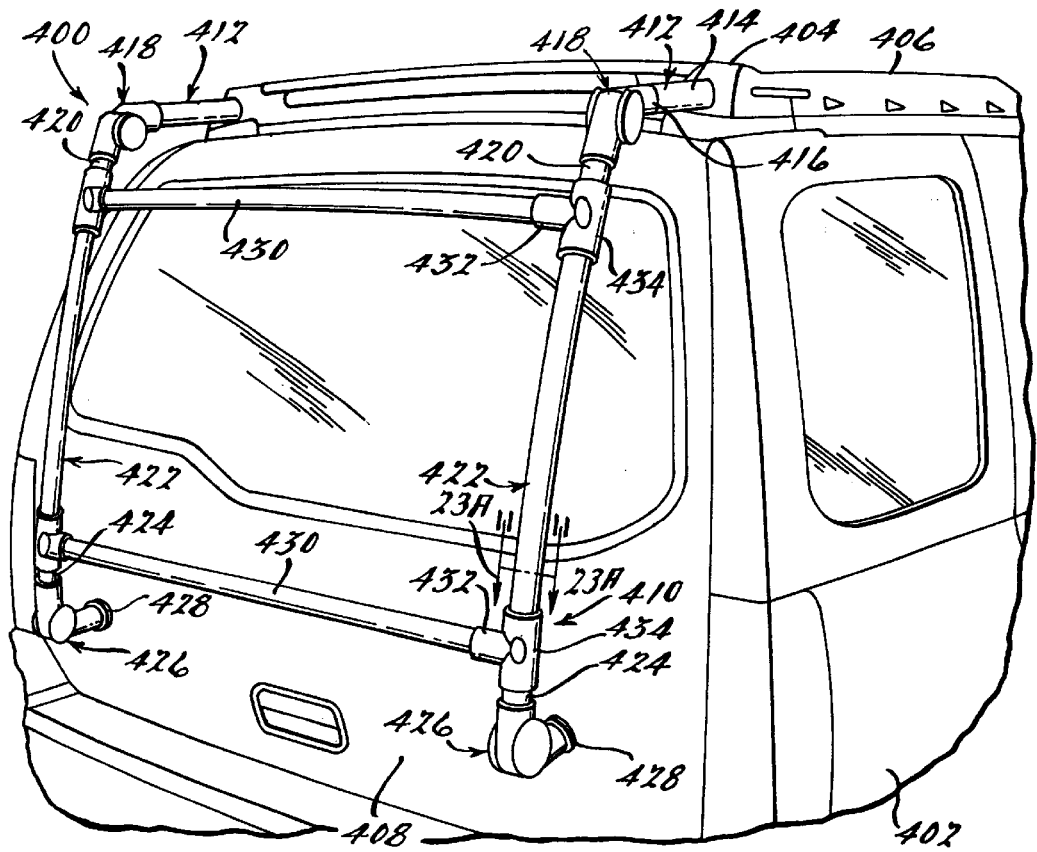
FIG. 22 is a perspective view of another alternative embodiment of the article carrier of the present invention.

Referring to FIG. 22, an articulating vehicle article carrier 400 is shown in accordance with another alternative embodiment of the present invention. The article carrier 400 differs from the previous embodiments in that it is not able to be positioned on top of the roof of vehicle 402, but is quickly and easily removable from the vehicle 402 when it is not needed. Furthermore, the construction of the article carrier 400 is such that it is able to be placed in a compact arrangement, once removed, so that it can be stored conveniently within an area such as a garage, or even within a cargo area of the vehicle itself.

With further reference to FIG. 22, a pair of supports 404 are fixedly secured to a roof portion 406 of a vehicle 402. A cargo supporting structure 410 having a pair of upper coupling links 412 are pivotally attached to the supports at first ends 414 thereof. Second ends 416 are attached to a first or upper pair of pivot assemblies 418. The pivot assemblies 418 are also attached to first ends 420 of a pair of main support members 422. These support members 422 are illustrated as tubular, slightly curving members, but it will be appreciated that they could just as easily comprise different cross-sectional shapes. The main support members 422 are preferably comprised of aluminum to provide very light weight yet structurally strong members.

Figure 23:
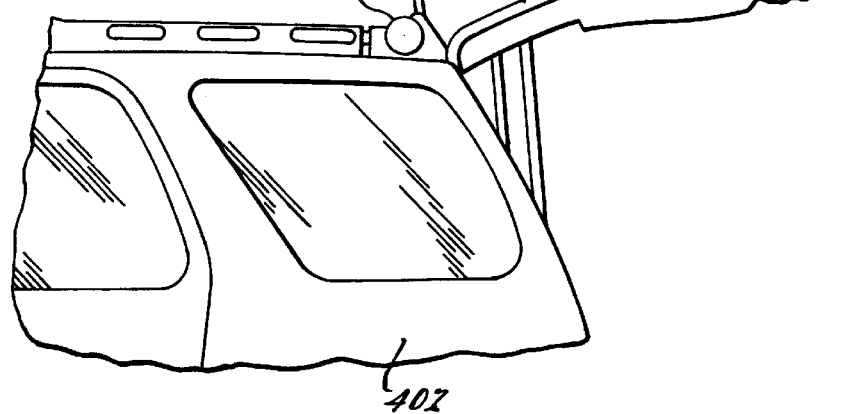
FIG. 23 is a side view of the article carrier shown in FIG. 22 but with the liftgate of the vehicle in the open position.

The main support members 422 are attached at second ends 424 thereof to a second pair of pivot assemblies 426. The second pair of pivot assemblies 426 are each in turn releasably engageable with a pair of anchor assemblies 428. Each of the anchor assemblies 428 are fixedly secured to a liftgate 408 of the vehicle 408. The cargo supporting structure 410 thus is positioned over the liftgate 408 when in use. Since the cargo supporting structure 410 is very lightweight, the presence of the structure 410 adds very little additional weight to the liftgate 408 when the liftgate is being lifted by a user. Thus, to the user, the effort required to lift the liftgate is almost the same whether or not the cargo supporting structure 410 is attached to the vehicle 408. FIG. 23 shows the article carrier 400 with the liftgate 408 in its raised position.

The cargo supporting structure 410 also preferably includes at least one, and more preferably a pair, of cross bars 430 supported on the main support members 422. Each of the cross bars 430 includes a mounting arm 432 at each of its opposite ends which are secured to a respective one of the main support members 422 at a predetermined position by a manually engageable fastening member 434. This coupling is shown in greater detail in FIG. 23A. The manually engageable fastening member 434 has an enlarged, manually graspable portion 434a and a partially threaded portion 434b. The partially threaded portion 434b threadably engages with a tapped hole 434c within each mounting arm 432. A rivnut 435 is also preferably included for allowing the cross bar 430 to be attached parallel to the support member 422 when the article carrier 400 is detached from the vehicle 408. This feature will be described in greater detail momentarily.

An additional feature of the cargo supporting structure 410 is that the cross bars 430 can be secured to the main support members 422 as illustrated in FIG. 24 when the structure 410 is removed from the vehicle 408 for storage. This is accomplished by the rivnut fastener 435 shown in FIG. 23A being included at a predetermined point along the length of each cross bar 430 to allow the separated cross bar 430 to be reattached via the fastening member 434 while positioned parallel to it. This also requires forming a hole at the proper point along the length of each support member 422 by which the fastening member 434 can be extended through. Each main support member 422 can then be handled separately in a compact configuration with one of the cross bars 430 attached to it. It will be appreciated that a variety of attachment or clamping mechanisms could readily be used to releasably secure the cross bars 430 generally parallel to the main support members 422. It will also be appreciated that the mounting arm 432 could be formed with one or more loop portions to facilitate the attachment of bungee cords or other fastening straps or cords. FIG. 24 also illustrates an alternative preferred form of mounting arm 432' having such a loop portion 433'.

Referring to FIG. 25, the construction of one of the upper pivot assemblies 418 can be seen. It will be appreciated, however, that the construction of each of the lower pivot assemblies 426 is identical to that shown in FIG. 25. A first pivot element 439 includes a tubular free flange portion 439a having an enlarged connecting ring 438. A second pivot element 441 also includes a tubular free flange portion 441a and an enlarged connecting ring 440 having a slot 442 formed therein. The free flange portion 439a is intended to be coupled to the second end 416 of the upper coupling link 412 with threaded fasteners or other conventional fastening means, while the free flange portion 441a of the second pivot element 441 is intended to be secured to an end of one of the main support members 422.

The slot 442 is just slightly wider than the width of the connecting ring 438 such that it is able to receive the connecting ring 438 therein. First and second identical coupling elements 444 each include an enlarged shoulder portion 446 and a hub portion 448. The hub portion 448 has an outer diameter which permits it to snugly slide within the connecting rings 440 and 438 when the two rings 440 and 438 are coupled together. The hub portion 448 includes a pair of slots 450 each having a somewhat flexible arm 452. The slots 450 open in opposite directions.

The two coupling elements 444 are secured to each other by first pressing each into the assembled connecting rings 438 and 440 from opposite sides. The coupling elements 444 are then rotated slightly such that the arms 452 of each coupling element are aligned with the slot 450 of the other coupling element. Then the coupling elements 444 can be rotated in different directions, which causes each arm 452 to snap into engagement with the slot 450 of the opposite coupling element 444. At this point the first and second pivot elements 439 and 441 will be securely held together while permitting pivotal movement of the upper coupling link 412 relative to its associated main support member 422. The opening formed in each pivot assembly also functions as a tie-down area where bungee cords or the like can be attached.

An alternative pivot assembly 460 is shown in FIG. 26. Pivot assembly 460 is similar to assembly 440 with the exception of a single piece locking hub 462. The locking hub includes a pair of shoulder portions 464 and 464a spaced apart by a central hub portion 466. One or more slots 468 are formed to extend into the central hub portion 466 from the shoulder portion 464a. When the locking hub 462 is inserted into the assembled combination of connecting rings 438 and 440, with the shoulder portion 464a being inserted first, that shoulder portion will compress slightly as it is forced through the connecting rings 438 and 440. As it clears the second connecting ring 440a it snaps out to lock the locking hub 462 within the connecting ring 440. Each of the first pivot assemblies 418 and second pivot assemblies 426, as well as the alternative pivot assembly 460 shown in FIG. 26, are all preferably made from high strength plastic but could also be formed from other suitably strong and lightweight materials.

With reference to FIG. 27, one of the supports 404 can be seen to include a recess 470 in which the first end 414 of one of the upper coupling links 412 is positioned. A conventional, manually engageable locking wheel 472 having a threaded shaft 474 extends through openings 476 in the first end 414 and into a threaded recess 478. When the locking wheel 472 is completely removed from the support 404 the upper coupling link 412 can be completely removed from the support.

Figure 28:
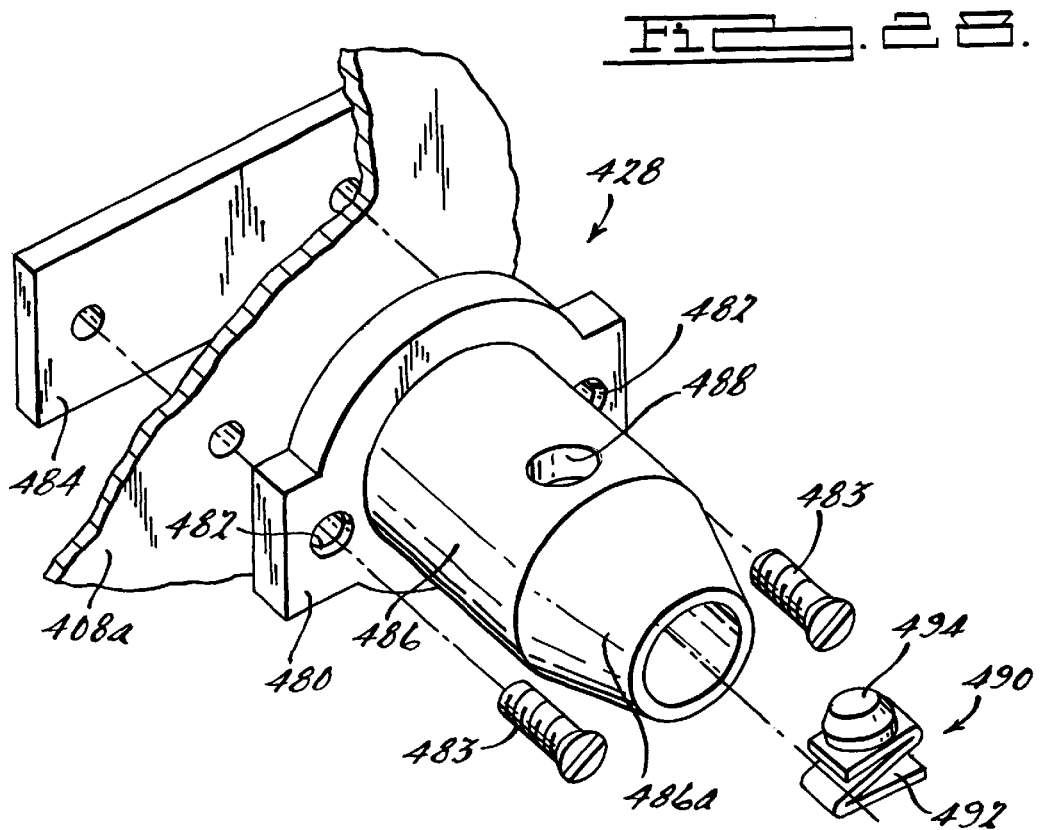
FIG. 28 is an exploded perspective view of one of the anchor assemblies fixedly attached to the rear liftgate.

Referring now to FIG. 28, one of the anchor assemblies 428 is shown. The anchor assembly 428 includes a flange portion 480 having a pair of openings 482. The openings 482 accommodate conventional fastening elements 483 that are used to secure the flange portion 480 to a suitable reinforcing member 484 within the liftgate 408.

The anchor assembly 428 also includes a tubular neck portion 486 integrally formed with or otherwise secured to the flange portion 480, and having a tapering end 486a. The neck portion 486 has an opening 488 for receiving therethrough a locking element 490. The locking element 490 is inserted from the rear (i.e., initially through the flange portion 480) into the interior area of the tubular neck portion 486. The locking element 490 includes a biasing element 492 which is a Z-shaped piece of spring steel having a head portion 494 sized to protrude through the opening 488. The head portion 494 preferably has a beveled edge.

Figure 29:
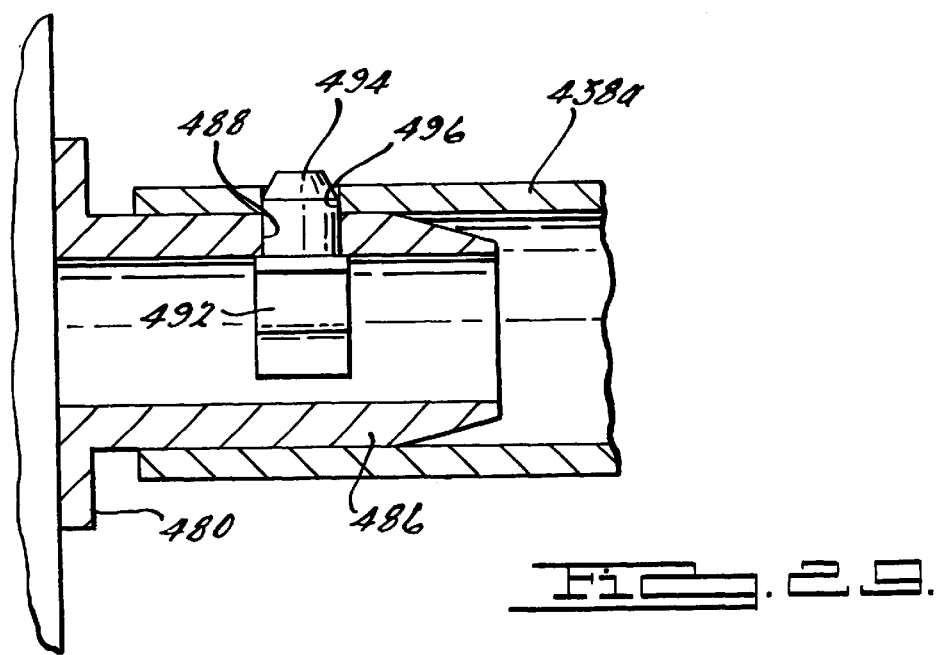
FIG. 29 is a side cross sectional view of a portion of the lower pivot assembly engaged with the anchor assembly.

With reference to FIG. 29, to connect the lower pivot assembly 428 to its associated anchor assembly 428 the free flange portion 438a is pushed over the tubular neck portion 486. The free flange portion 438a includes an opening 496 aligned with the opening 488 in the neck portion when the free flange portion is urged over the neck portion 486. When this occurs, the head portion 494 of the locking element 490 is momentarily depressed as the free flange portion 438a initially slides over the neck portion 486. As soon as the opening 496 reaches the opening 488, the head portion 494 snaps into the opening 488. To release the free flange portion 438a, the user pushes down on the head portion 494 and pulls the free flange portion 438a away from the neck portion 486. The beveled edge of the head portion 494 assists in causing the head portion 494 to be retracted.

Referring to FIG. 30, an articulating vehicle article carrier 500 is shown in accordance with another alternative embodiment of the present invention. The article carrier 500 differs from the previous embodiments in that it is not able to be positioned on top of the roof of vehicle 502, but is quickly and easily removable from the vehicle 502 when it is not needed. Furthermore, the construction of the article carrier 500 is such that it is able to be placed in a compact arrangement, once removed, so that it can be stored conveniently within an area such as a garage, or even within a cargo area of the vehicle itself.

With further reference to FIGS. 30 and 31, a pair of supports 504 are fixedly secured to a roof portion 506 of the vehicle 502. A cargo supporting structure 510 includes a pair of upper coupling links 512. The pair of upper coupling links 512 are pivotally attached to the supports 504 at first ends 514 via an upper connection assembly 513, which will be described below. Second ends 516 are attached to a first or upper pair of pivot assemblies 518. The pivot assemblies 518 are also attached to first ends 520 of a pair of main support members 522. These support members 522 are illustrated as generally rectangular, slightly curving members, but it will be appreciated that they could just as easily comprise different cross-sectional shapes. The main support members 522 are preferably comprised of aluminum to provide very light weight yet structurally strong members.

The main support members 522 are attached at second ends 524 thereof to a lower locking assembly 526. The lower locking assemblies 526 are each in turn releasably engageable with either a pair of anchor assemblies 528 (FIG. 31), which are fixedly secured to a liftgate 508 of the vehicle 502, or a pair of latching assemblies 527 disposed in the vehicle bumper 529 (FIG. 31). The cargo supporting structure 510 thus is positioned over the liftgate 508 when in use. Since the cargo supporting structure 510 is very lightweight, the presence of the structure 510 adds very little additional weight to the liftgate 508 when the liftgate is being lifted by a user. Thus, to the user, the effort required to lift the liftgate is almost the same whether or not the cargo supporting structure 510 is attached to the vehicle 502 and is raised in a manner generally consistent with previous embodiments described above.

Referring now to FIGS. 30–35, the cargo supporting structure 510 also preferably includes at least one, and more preferably a pair, of cross bars 530 supported on the main support members 522. Each of the cross bars 530 includes a mounting portion 532 at each of its opposite ends which are secured to a respective one of the main support members 522 at a predetermined position by a manually engageable fastening member 534. This coupling is shown in greater detail in FIG. 32. Mounting portion 532 in turn is secured to cross bar 530 via thread fasteners 530a or other conventional fasteners.

Figure 33:
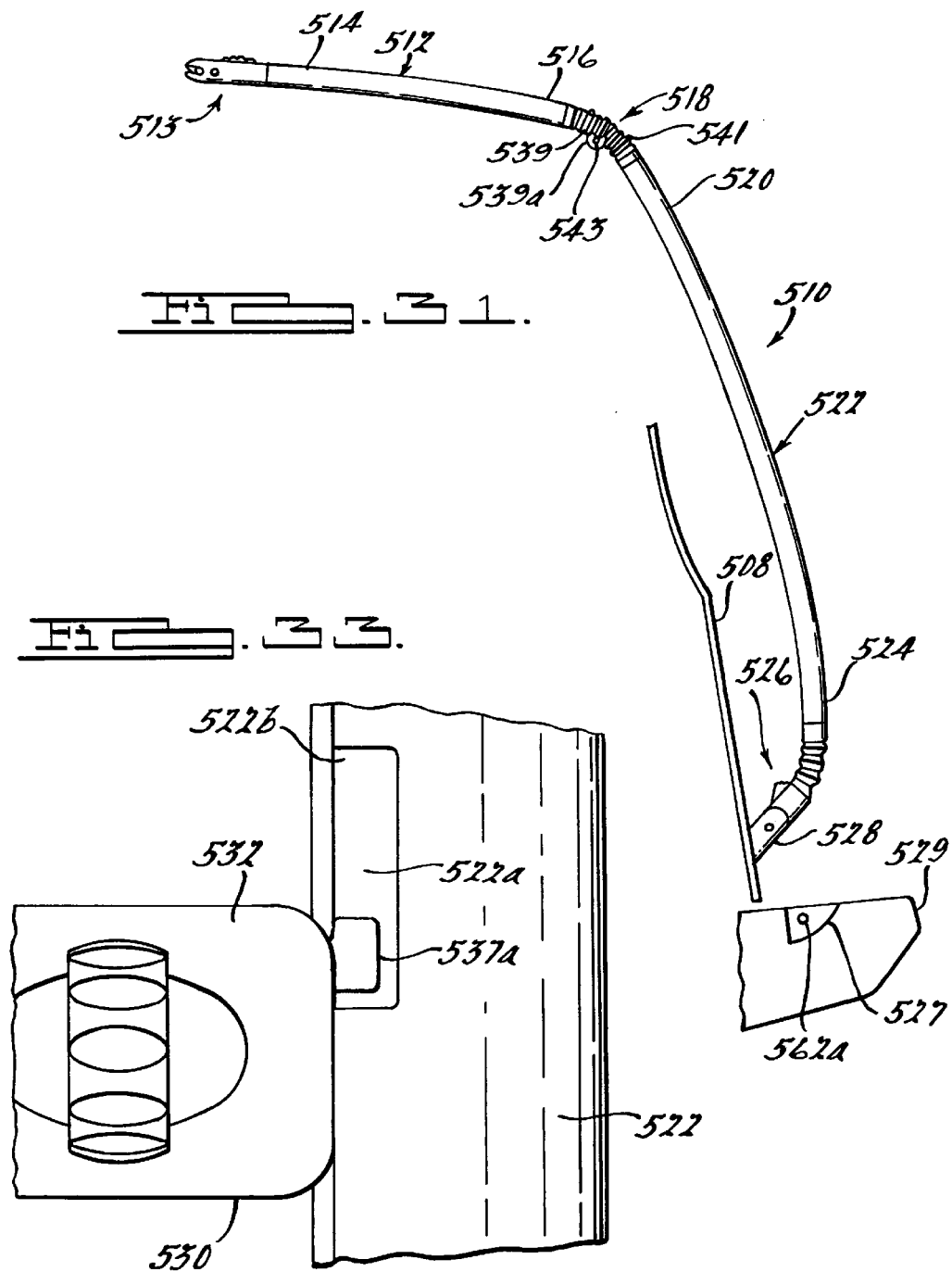
FIG. 33 is an enlarged perspective view of an alternative embodiment of the locking engagement between a cross member and a main support member, with portions removed for clarity.

As best seen in FIGS. 32, 34, and 35, the manually engageable fastening member 534 has an enlarged, manually graspable portion 534a and a threaded internal portion 534b. The threaded internal portion 534b threadably engages with a threaded screw member 534c Threaded screw member 534c extends from a generally inverted T-shaped mounting member 534d, which is disposed within a track 522a formed in main support member 522. As best seen in FIGS. 33 and 34, mounting portion 532 of cross bar 530 generally includes a pair of generally identical protruding mounting flanges 532a. The pair of mounting flanges 532a are each sized to slide within track 522a of main support member 522 to permit vertical adjustment of cross bar 530. To facilitate insertion of cross bar 530 within track 522a of main support member 522, main support member 522 further includes a notched area 522b sized to enable cross bar 530 to be slid into track 522a.

Referring to FIGS. 31, 32, and 36, the construction of the pivot assemblies 518 can be seen. A first pivot element 539 includes a tubular flange portion 539a. A second pivot element 541 also includes a pair of tubular flange portions 541a. The tubular flange portion 539a is intended to be pivotally coupled to the pair of tubular flange portions 541a via a connection rod 543. The first pivot element 539 is fixedly coupled to the second end 516 of the upper coupling link 512 with threaded fasteners 539b or other conventional fastening means, while the second pivot element 541 is intended to be secured to an end of one of the main support members 522 via threaded fasteners 541b or other conventional fastening means.

Figure 37:
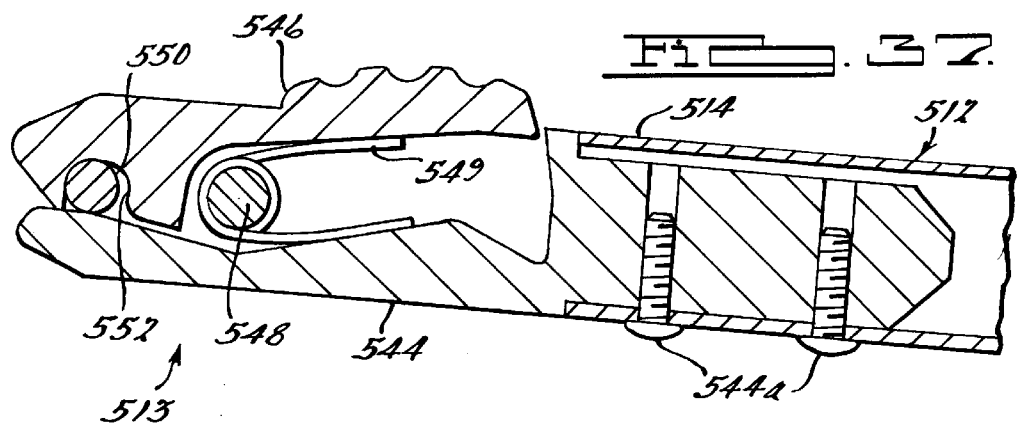
FIG. 37 is a side cross sectional view of an alternative embodiment of the upper connection assembly.
Figure 38:
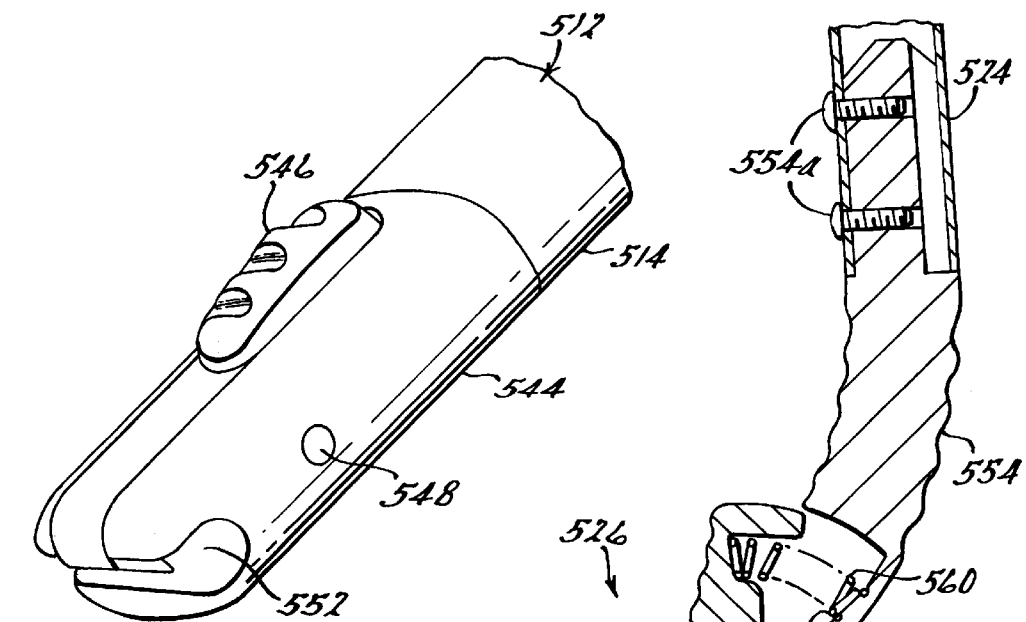
FIG. 38 is an enlarged perspective view of the alternative embodiment of the upper connection assembly.
Figure 39:
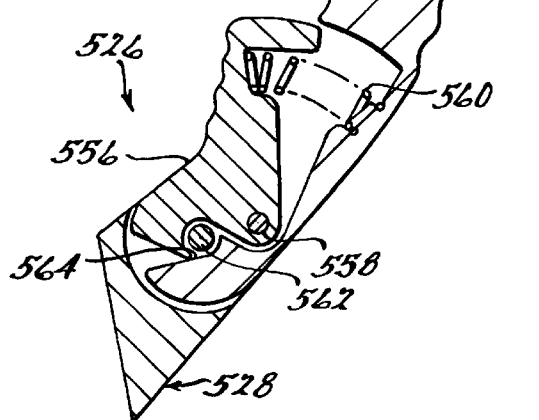
FIG. 39 is a side cross sectional view of an alternative embodiment of the lower locking assembly.

Referring to FIGS. 31, 37, and 38, the construction of upper connection assembly 513 can be seen. Upper connection assembly 513 includes a main member 544 and a pivoting member 546. Pivoting member 546 is pivotally coupled to main member 544 via a connecting pin 548. Pivoting member 546 is biased in a closed position by a torsional spring 549 such that pivoting member 546 and main member 544 cooperate to secure the article carrier 500 to the pair of supports 504 of the vehicle 502. More particularly, pivoting member 546 and main member 544 retain a transverse connection pin 550, which extends from each of the pair of supports 504, within a retaining channel 552 formed by pivoting member 546 and main member 544. The main member 544 is fixedly coupled to the first end 514 of the upper coupling link 512 with threaded fasteners 544a or other conventional fastening means. Upper connection assembly 513 can be released from connection with transverse connection pin 550 of support 504 by applying a compressing force to pivoting member 546 to overcome the biasing force of torsional spring 549.

Figure 40:
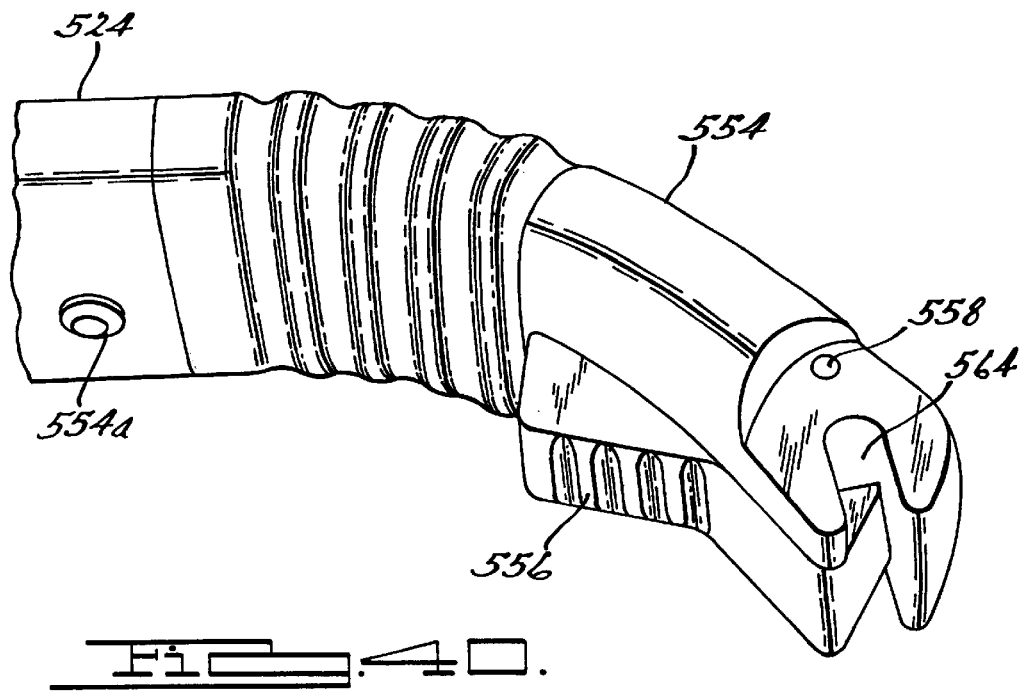
FIG. 40 is an enlarged perspective view of the alternative embodiment of the lower locking assembly.
Figure 41:
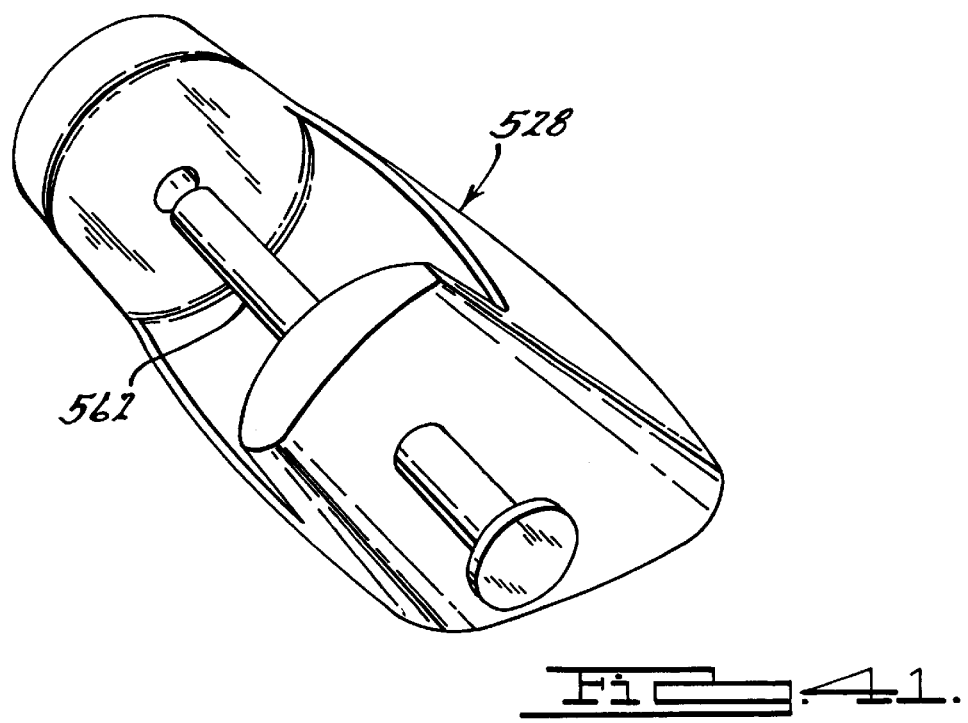
FIG. 41 is an enlarged perspective view of the anchor assembly.

Similarly, referring now to FIGS. 31, 39, 40, and 41, the construction of lower locking assembly 526 is seen. Lower locking assembly 526 includes a main member 554 and a pivoting member 556. Pivoting member 556 is pivotally coupled to main member 554 via a connecting pin 558. Pivoting member 556 is biased in a closed position by a compression spring 560 such that pivoting member 556 and main member 554 cooperate to secure the article carrier 500 to the anchor assembly 528. More particularly, as best seen in FIGS. 38 and 40, pivoting member 556 and main member 554 retain a transverse connection pin 562, which extends from each of the pair of anchor assemblies 528, within a retaining channel 564 formed by pivoting member 556 and main member 554. It should be noted that a second transverse connection pin 562a extends from the latching assemblies 527 disposed in the vehicle bumper 529. Therefore, during operation, lower locking assembly 526 is preferably coupled to the anchor assembly. 528 to facilitate raising of the liftgate 508. However, while transporting articles upon the article carrier 500, lower locking assembly 526 is preferably coupled to latching assembly 527 disposed in the vehicle bumper 529. This arrangement provides additional carrying capacity afforded by the structural support of the bumper 529. However, it should be understood that the liftgate 508 may be constructed such that it alone can carry the weight of the additional articles fastened to cargo supporting structure 510, which may eliminate the need for latching assembly 527.

The main member 554 is fixedly coupled to the second end 524 of the main support member 522 with threaded fasteners 554a or other conventional fastening means. Lower locking assembly 526 can be released from connection with transverse connection pin 562 of anchor assembly 528 by applying a compressing force to pivoting member 556 to overcome the biasing force of compression spring 560, thereby opening retaining channel 564 to remove transverse connection pin 562.

Accordingly, it should be appreciated that upper coupling link 512, main support member 522, liftgate 508, and the roof of vehicle 502 together define a four-bar linkage that is capable of pivoting when liftgate 508 is actuated.

Referring to FIGS. 42–47, an articulating vehicle article carrier 600 is shown in accordance with yet another alternative embodiment of the present invention. The article carrier 600 differs from the previous embodiments in that it is not able to be positioned on top of the roof of vehicle 602, but is quickly and easily removable from the vehicle 602 when it is not needed. Furthermore, the construction of the article carrier 600 is such that it is able to be placed in a compact arrangement, once removed, so that it can be stored conveniently within an area such as a garage, or even within a cargo area of the vehicle itself. Moreover, the article carrier 600 is also able to be automatically disengaged from the vehicle bumper 629 upon opening of the liftgate 608.

The structure and operation of the present embodiment is similar to that described above, therefore in the interest of brevity such structure and operation will not be repeated herein, except where otherwise noted. The present embodiment differs primarily from the previous embodiment in the design and operation of the lower locking assembly 626.

Figure 42:
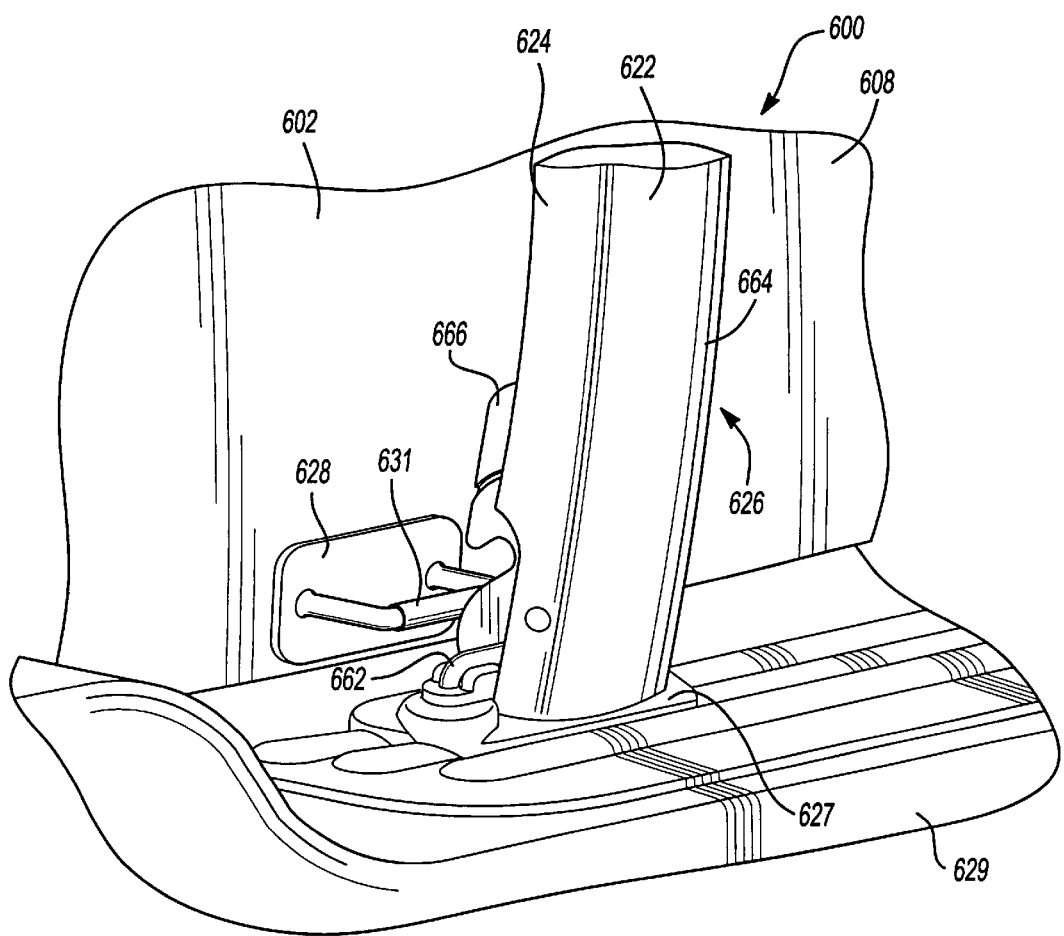
FIG. 42 is an enlarged perspective view of a rear portion of a vehicle illustrating a yet another embodiment of a multi-position, articulating, article carrier apparatus in accordance with the present invention secured to the outer body surface of the vehicle with the apparatus in a first or lowered position.
Figure 43:
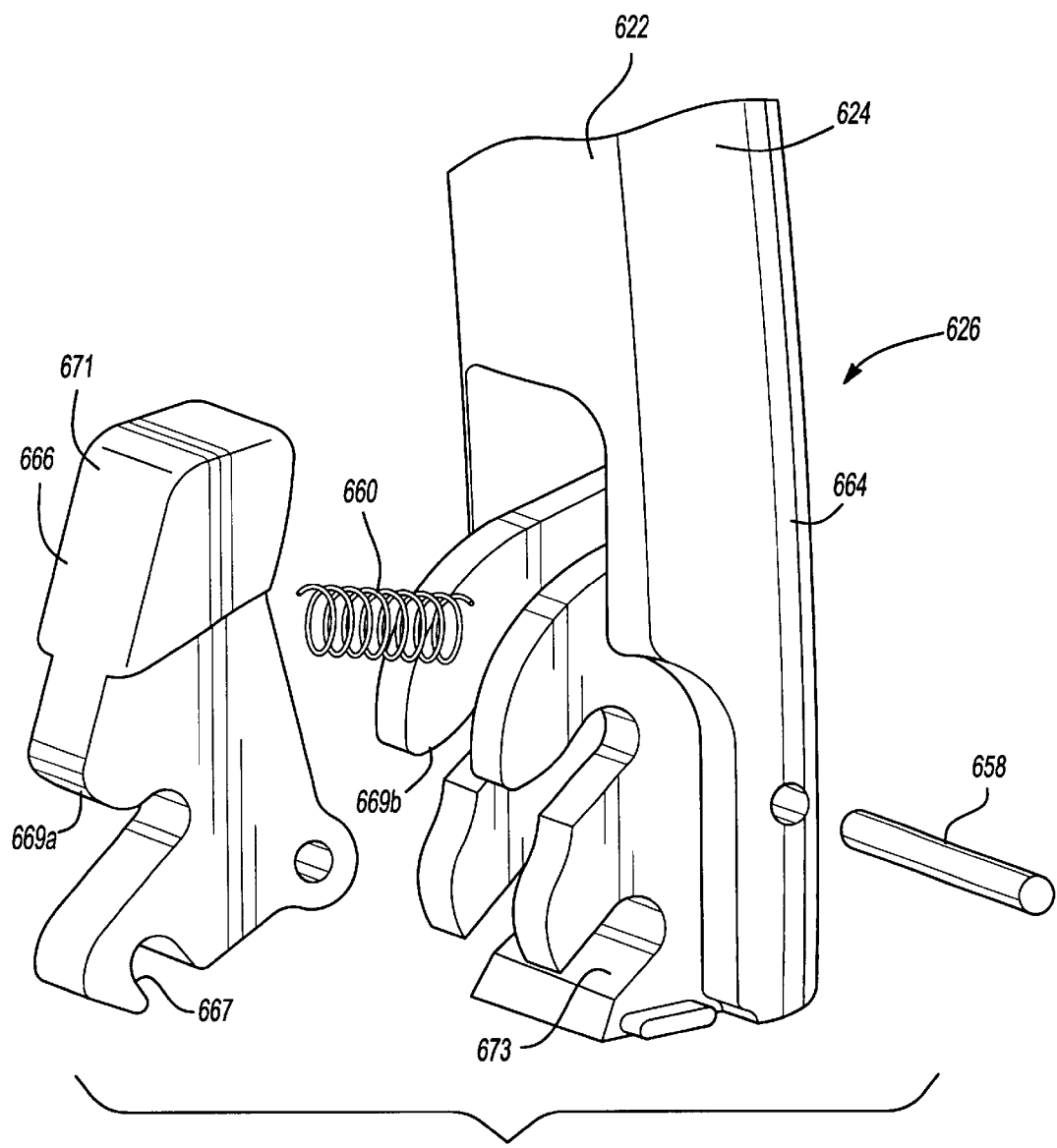
FIG. 43 is an enlarged, exploded, perspective view of a lower locking assembly according to the principles of the present invention, with portions removed for clarity.

As shown in FIGS. 42 and 43, the main support member 622 is attached at a second end 624 thereof to a lower locking assembly 626. Lower locking assembly 626 is in turn releasably engageable with either a liftgate anchor 628, which is fixedly secured to a liftgate 608 of the vehicle 602, or a bumper anchor 627 mounted to or disposed in vehicle bumper 629. The cargo supporting structure 610 thus is positioned over the liftgate 608 when in use.

Still referring to FIGS. 42 and 43, the construction of lower locking assembly 626 is seen. Lower locking assembly 626 includes a main member 664 and a pivoting member 666. Pivoting member 666 is pivotally coupled to main member 664 via a connecting pin 658. Pivoting member 666 is biased in a closed position by a compression spring 660 such that pivoting member 666 and main member 664 cooperate to secure the article carrier 600 to the bumper anchor 627. More particularly, as best seen in FIGS. 43–47, pivoting member 666 includes a hooked end portion 667, a liftgate engaging slot 669 (FIGS. 44 and 45), and a hand release 671. As will be described below and illustrated in the figures, liftgate engaging slot 669 is in fact a cooperating set of two slots—a first slot 669a formed in pivoting member 666 (FIG. 43) and a second slot 669b formed in main member 664 (FIG. 43). First slot 669a and second slot 669b are slightly offset relative to each other (see FIGS. 44 and 45) to effect a pivoting movement of pivoting member 666 about connecting pin 658 (see FIG. 44).

Accordingly, hooked end portion 667 (FIG. 43) of pivoting member 666 cooperates with a bumper striker slot 673 (FIG. 43) formed in main member 664 to retain a bumper striker 662, which extends from bumper anchors 627. Bumper striker 662 is thus retained with a retaining channel 670 (FIGS. 44 and 45) formed by hooked end portion 667 of pivoting member 666 and bumper striker slot 673 formed in main member 664.

Figure 45:
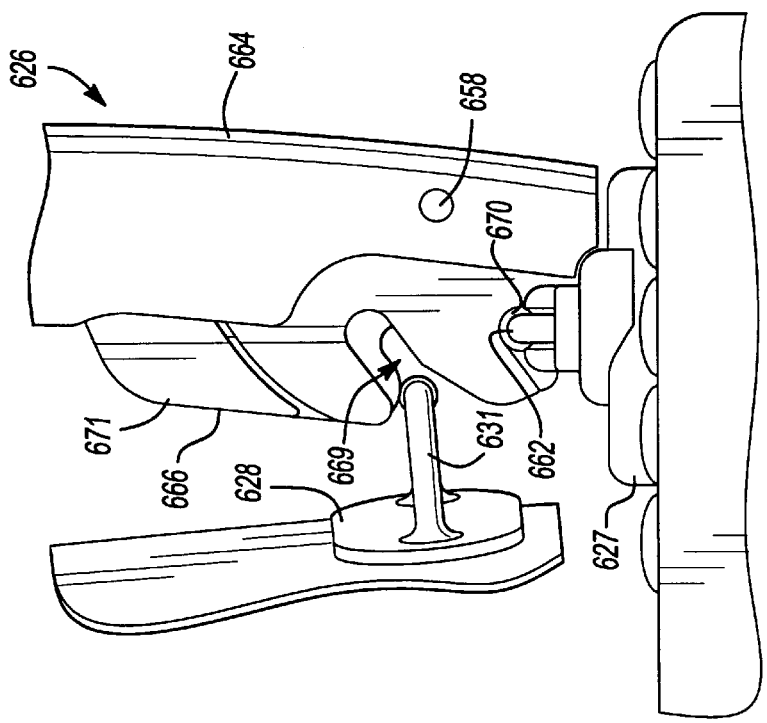
FIG. 45 is a side view of the lower locking assembly as a liftgate striker first engages a release latch.
Figure 44:
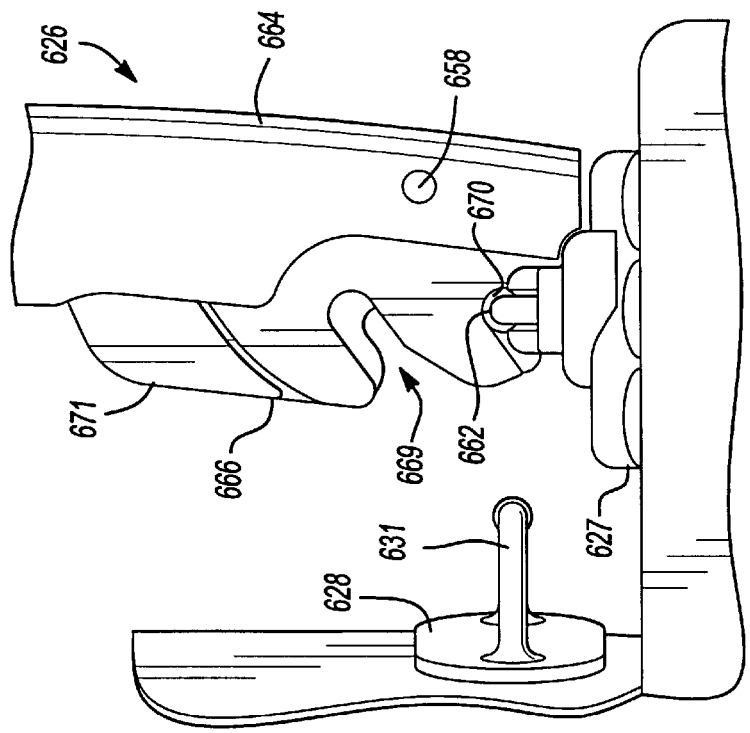
FIG. 44 is a side view of the lower locking assembly in a closed or latched position.
Figure 47:
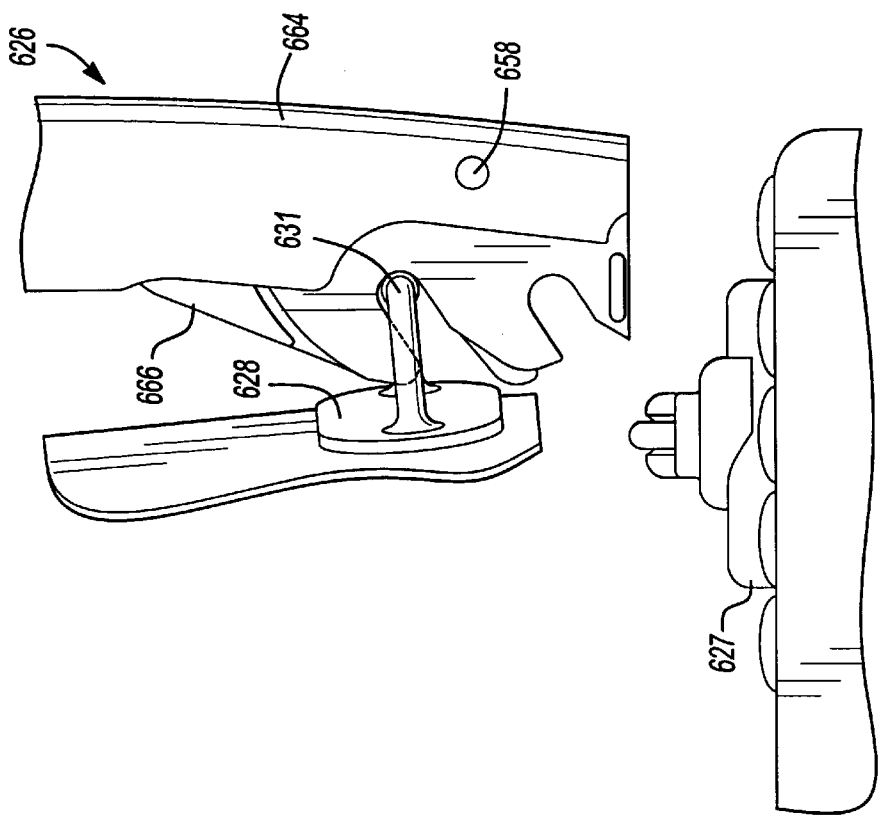
FIG. 47 is a side view of the lower locking assembly as the liftgate and liftgate striker automatically raises the lower locking assembly from the bumper striker.
Figure 46:
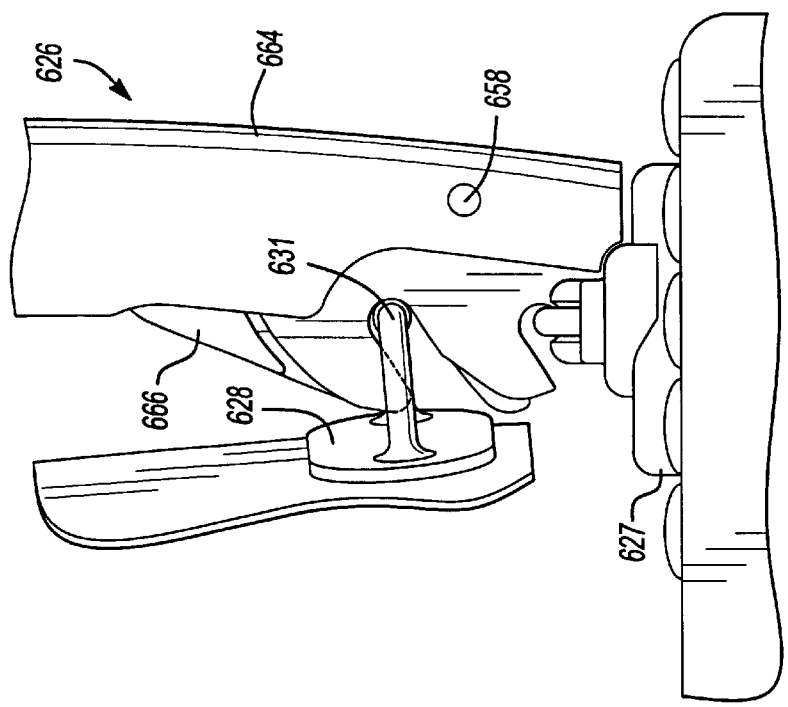
FIG. 46 is a side view of the lower locking assembly as the liftgate striker unlatches a hook member from a bumper striker.

During operation, the present embodiment enables an automatic and reliable means of disengaging/engaging article carrier 600 from vehicle bumper 629. In order to open liftgate 608 of vehicle 602, while article carrier 600 is fixedly coupled to vehicle bumper 629, an operator need only unlatch liftgate 608 and begin raising liftgate 608 in a conventional manner. As seen in FIG. 44, during this raising process a liftgate striker 631, which extends from liftgate anchor 628 on liftgate 608, is first spaced apart and disengaged from liftgate engaging slot 669. Upon further actuation, as seen in FIG. 45, liftgate striker 631 of liftgate anchor 628 engages liftgate engaging slot 669. The force of liftgate striker 631 entering liftgate engaging slot 669 drives pivoting member 666 clockwise (in the figure) about connecting pin 658. This movement retracts hooked end portion 667 of pivoting member 666 from bumper striker slot 673 (FIG. 46) permitting unobstructed withdrawal of bumper striker 662 of bumper anchor 627. Upon continued lifting of liftgate 608, lower locking assembly 626 and thus article carrier 600 now becomes automatically coupled to liftgate 608 rather than bumper anchor 627 on vehicle bumper 629. During a latching operating, the opposite occurs-retracting of liftgate 608 causes bumper striker slot 673 to engage bumper striker 662 until liftgate striker 631 retracts from slot 669, whereby hooked end portion 667 extends and retains bumper striker 662.

Article carrier 600 may also be manually disengaged from bumper striker 662 simply by compressing hand release 671 and driving pivoting member 666 clockwise (in the figure) about connecting pin 658. This movement retracts hooked end portion 667 of pivoting member 666 from bumper striker slot 673 (FIG. 46) permitting unobstructed manual withdrawal of bumper striker 662 of bumper anchor 627.

Accordingly, it should be appreciated that upper coupling link 612, main support member 622, liftgate 608, and the roof of vehicle 602 together define a four-bar linkage that is capable of pivoting when liftgate 608 is actuated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle article carrier for a motor vehicle, the motor vehicle having a liftgate and a bumper, the vehicle article carrier comprising:

a liftgate striker connectable to the liftgate;

a bumper striker connectable to the bumper a first link pivotally connectable at a first end with the roof support structure of the motor vehicle;

a second link having a first end and a second end, said first end of said second link being pivotally coupled to a second end of said first link; and a locking assembly coupled to said second end of said second link, said locking assembly operable in a closed position to couple said second link to the bumper striker and in an opened position to release said bumper striker in response to contact from said liftgate striker.

2. The vehicle article carrier according to claim 1 wherein said locking assembly comprises a main member, a pivoting member pivotally coupled to said main member, and a spring member biasing said pivoting member into said closed position.

3. The vehicle article carrier according to claim 2 wherein said locking member further comprises a first slot formed in said main member for receiving said bumper striker, a second slot formed in said main member for receiving said liftgate striker, and a hooked end member formed at an end of said pivoting member operable to retain said bumper striker within said first slot.

4. The vehicle article carrier according to claim 3 wherein said locking member further comprises a hand release on said pivoting member positionable into a first position to manually release said bumper striker from said first slot.

5. A vehicle article carrier for carrying articles adjacent a liftgate of a motor vehicle, the motor vehicle having a roof support structure and a bumper, the vehicle article carrier comprising:

a first link pivotally connectable at a first end with the roof support structure of the motor vehicle;

a second link having a first end and a second end, said first end of said second link being pivotally coupled to a second end of said first link; and a locking assembly coupled to said second end of said second link, said locking assembly operable in a first position to retain said second link to the bumper and in a second position to automatically retain said second link to the liftgate in response to lifting of said liftgate.

6. The vehicle article carrier according to claim 5 wherein said locking assembly comprises a main member, a pivoting member pivotally coupled to said main member, and a spring member biasing said pivoting member into a closed position.

7. The vehicle article carrier according to claim 6 wherein said locking member further comprises a first slot formed in said main member for receiving a bumper striker, a second slot formed in said main member for receiving a liftgate striker, and a hooked end member formed at an end of said pivoting member operable to retain said bumper striker within said first slot.

8. The vehicle article carrier according to claim 7 wherein said locking member further comprises a hand release on said pivoting member for manually disengaging said main member from said bumper striker.

9. A vehicle article carrier for a motor vehicle, the motor vehicle having a liftgate and a bumper, the vehicle article carrier comprising:

a liftgate striker connectable to the liftgate;

a bumper striker connectable to the bumper a first link pivotally connectable at a first end with the roof support structure of the motor vehicle;

a second link having a first end and a second end, said first end of said second link being pivotally coupled to a second end of said first link; and a locking assembly coupled to said second end of said second link, said locking assembly having a first slot, a second slot, and a retaining hook disposed in said first slot and engageable with said bumper striker, said locking assembly operable in a closed position to couple said second link to the bumper striker and in an opened position to release said bumper striker in response to said liftgate striker engaging said second slot.

10. The vehicle article carrier according to claim 9 wherein said locking assembly comprises a main member, a pivoting member pivotally coupled to said main member, and a spring member biasing said pivoting member into said closed position.

11. The vehicle article carrier according to claim 10 wherein said locking member further comprises a hand release on said pivoting member positionable into a first position to manually release said bumper striker from said first slot.

* * * * *